_(12)_ United States Patent
Fujii et al.

(10) Patent No.: US 6,853,401 B2
(45) Date of Patent: Feb. 8, 2005

(54) DIGITAL CAMERA HAVING SPECIFIABLE TRACKING FOCUSING POINT

(75) Inventors: Shinichi Fujii, Osaka (JP); Toshiyuki Tanaka, Nishinomiya (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/041,641

(22) Filed: Jan. 7, 2002

(65) Prior Publication Data

US 2002/0122121 A1 Sep. 5, 2002

(30) Foreign Application Priority Data

Jan. 11, 2001 (JP) ......................................... 2001-003698

(51) Int. Cl.$^7$ ........................... H04N 9/73; H04N 5/262; H04N 5/232
(52) U.S. Cl. ............................... 348/223.1; 348/231.2; 348/240.2; 348/333.02; 348/347; 348/349
(58) Field of Search ......................... 348/207.99, 222.1, 348/223.1, 231.99, 231.2, 231.4, 240.99, 240.2, 333.01, 333.02, 333.03, 345, 347, 349–352, 208.5, 208.6, 208.12, 240.1, 333.12, 346, 354–356, 362–364, 369

(56) References Cited

U.S. PATENT DOCUMENTS

| | | | | |
|---|---|---|---|---|
| 5,187,776 A | * | 2/1993 | Yanker | 345/800 |
| 5,223,934 A | * | 6/1993 | Hong | 348/333.03 |
| 5,625,415 A | * | 4/1997 | Ueno et al. | 348/350 |
| 5,760,831 A | * | 6/1998 | Tanaka et al. | 348/223.1 |
| 5,808,678 A | * | 9/1998 | Sakaegi | 348/333.03 |
| 5,835,641 A | * | 11/1998 | Sotoda et al. | 348/240.99 |
| 6,188,432 B1 | * | 2/2001 | Ejima | 348/240.99 |
| 6,239,838 B1 | * | 5/2001 | Lee et al. | 348/240.99 |
| 6,320,614 B1 | * | 11/2001 | Kawashima | 348/211.99 |
| 6,476,868 B1 | * | 11/2002 | Kaji et al. | 348/333.02 |
| 6,522,360 B1 | * | 2/2003 | Miyawaki et al. | 348/347 |
| 6,545,710 B1 | * | 4/2003 | Kubo et al. | 348/223.1 |

FOREIGN PATENT DOCUMENTS

| | | |
|---|---|---|
| JO | 2000-287170 A | 10/2000 |
| JP | 64-028609 A | 1/1989 |
| JP | 03-187580 A | 8/1991 |
| JP | 04-264511 A | 9/1992 |
| JP | 06-205377 A | 7/1994 |
| JP | 07-283991 A | 10/1995 |
| JP | 08-265630 A | 10/1996 |
| JP | 10-191132 A | 7/1998 |

* cited by examiner

Primary Examiner—Ngoc-Yen Vu
(74) Attorney, Agent, or Firm—Sidley Austin Brown & Wood LLP

(57) ABSTRACT

On a screen G1 of a liquid crystal display, a digital camera displays an AF cursor for use as a focusing point. Thus, a shooter shifts the AF cursor to the portion of a subject to be focused, so as to carry out the setting. Here, when the subject is zoomed up to an enlarged screen G2 through an optical zooming operation, the AF cursor is displayed on the enlarged screen G2, following the subject. Moreover, in the case when the subject is electronically zoomed up to an enlarged screen G3, the AF cursor is also displayed on the enlarged screen G3, following the subject. Thus, even when a zooming process is carried out, it is not necessary to adjust the position of the AF cursor; thus, it becomes possible to improve the operability of the digital camera.

19 Claims, 22 Drawing Sheets

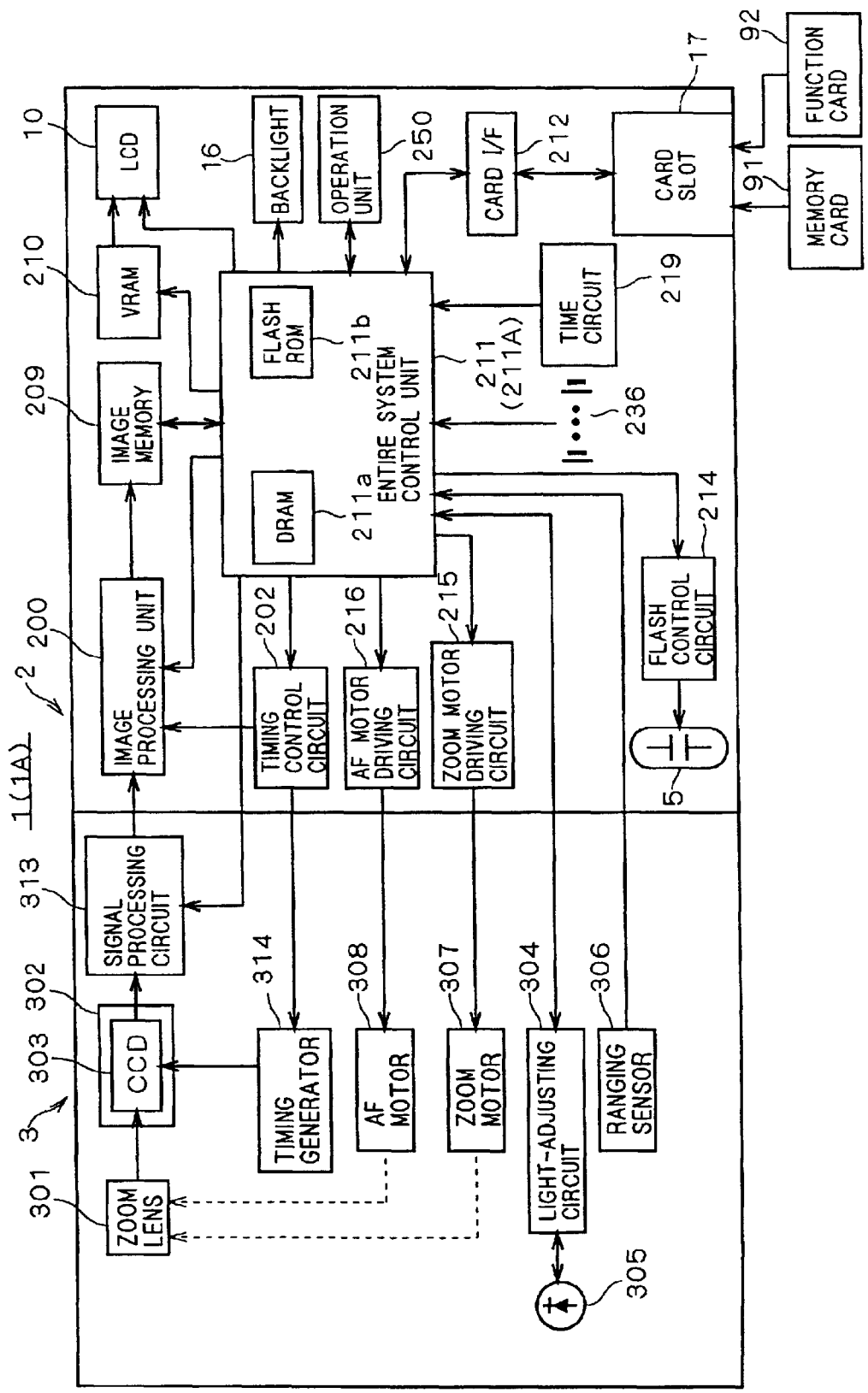
F I G. 5

DIGITAL CAMERA HAVING SPECIFIABLE TRACKING FOCUSING POINT

This application is based on application No. 2001-3698 filed in Japan, the contents of which are hereby incorporated by reference.

BACKGROUND OF THE INVENTION

1. Field of the Invention

The present invention relates to a digital camera wherein a focusing point, etc. can be specified.

2. Description of the Background Art

In conventional digital camera techniques, Japanese Patent Application Laid-Open No. 3-187580/1991 has disclosed techniques in which the shooter can desirably set AF and AE points with respect to a subject so as to prevent a centered blanking image and problems with an image taken with mixed subjects located closely and far apart from the camera.

However, the above-mentioned camera is applicable to the case in which a mono-focal point lens is used; however, in the case when it is applied to the case in which a zooming operation is carried out by a zoom lens or the case in which an electronic zooming operation is carried out, the relationship among three factors, that is, the subject, display screen and AF point, needs to be taken into consideration. However, the above-mentioned description has not described anything about this point.

With respect to other conventional techniques, Japanese Patent Application Laid-Open No. 8-265630/1996 and Japanese Patent Application Laid-Open No. 10-191132/1998 have disclosed a technique in which AF and AE points are set through gazing line detection; however, problems with this technique are the necessity of providing an exclusively-used hardware for detecting the gazing line, the inapplicability in the case when the shooter is wearing glasses and the necessity of calibration for absorbing differences in individual persons; thus, at present, this technique has not been put into practical use.

SUMMARY OF THE INVENTION

The present invention relates to a digital camera.

In accordance with the present invention, this digital camera is provided with: an image sensor for picking up an image of a subject and for generating a subject image; a display for displaying the subject image generated by the image sensor on a screen; a specifying member for specifying a specific position on the screen; an image-pickup controller for controlling an image-pickup operation based upon the specified position specified by the specifying member; an altering member for altering magnification of the subject image displayed on the display; and a first specified position controller for maintaining the relationship between the subject and the specified position independent of an alteration of magnification carried out by the altering member. Therefore, this arrangement eliminates the necessity of adjusting the specified position upon zooming, thereby making it possible to improve the operability of the digital camera.

In a preferred embodiment of the present invention, this digital camera is arranged so that in the case when the second specified position controller is selected by the selector with the specified position being out of the screen of the display by the alteration in the magnification by the altering member, the second specified position controller shifts the specified position to a predetermined position within the screen. Therefore, it becomes possible to prevent an unnatural situation with the specified position disappearing from the display screen.

Thus, the object of the present invention is to provide a digital camera that provides better operability in specifying factors such as focusing point.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram that shows an inner construction of the digital camera;

DESCRIPTION OF THE PREFERRED EMBODIMENTS

[First Preferred Embodiment]

<Essential Construction of Digital Camera>

FIGS. 1 through 4 are a front view, a rear face view, a side view and a bottom view, which show a digital camera 1 in accordance with the first preferred embodiment of the present invention, and FIG. 5 is a block diagram that shows the inner structure of the digital camera 1.

Figure 1:
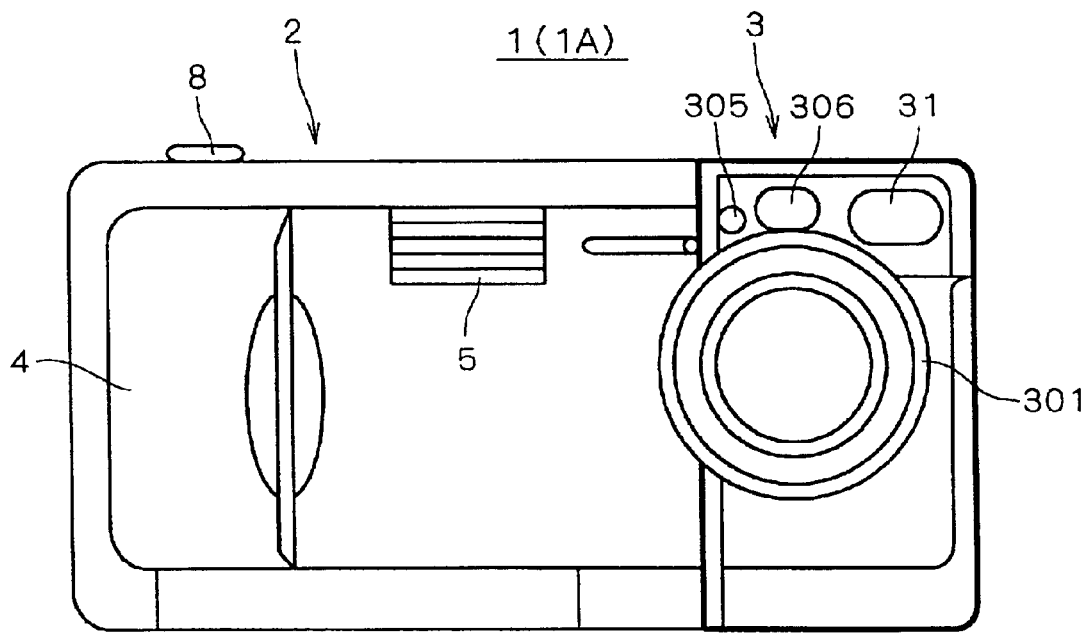
FIG. 1 is a front view of a digital camera in accordance with a first preferred embodiment of the present invention.

As illustrated in FIG. 1, the digital camera 1 is constituted by a box-shaped camera main body 2 and an image-pickup unit 3 (indicated by thick lines in FIGS. 1, 2 and 4) having a rectangular parallelepiped shape. The image pickup unit 3 is provided with a zoom lens 301 having a macro-function that is an image pickup lens, and a light-adjusting sensor 305 for receiving reflected light of flash light from a subject and an optical finder 31, in the same manner as a lens-shutter camera using silver halide films (hereinafter, referred to as "silver halide camera"). The zoom lens 301 is capable of zooming from 35 mm to 70 mm in the focal length in the case of conversion to a silver halide camera using a 35-mm film.

Here, at a rear position of the zoom lens 301 inside the image pickup unit 3, a CCD 303 (see FIG. 5), which is a CCD color area sensor functioning as an image-pickup means, is provided, and this CCD 303 serves as one portion of an image-pickup circuit 302.

As illustrated in FIG. 1, on the front face of the camera main body 2, a grip portion 4 is placed on the left end portion, a built-in flash 5 is placed on the upper portion in the center and a shutter button 8 is placed on the upper surface.

Figure 2:
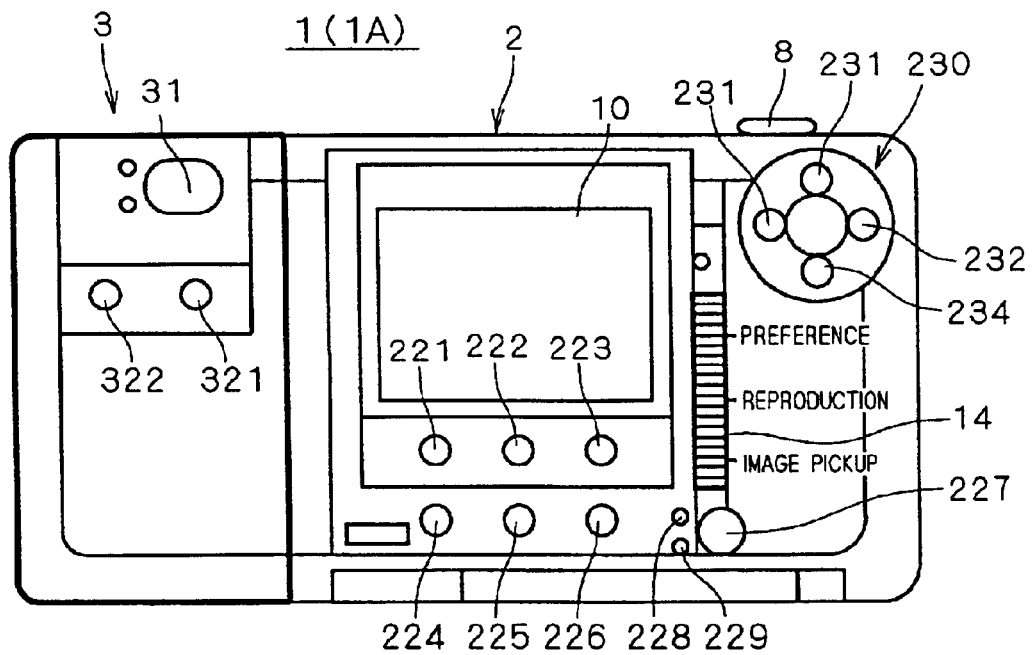
FIG. 2 is a back view of the digital camera.

As illustrated in FIG. 2, on the rear face of the camera main body 2, a LCD 10 for carrying out a monitor display (corresponding to a view finder) for a pickup image and for carrying out a reproduction display, etc., of recorded images are placed virtually in the center. This LCD 10 has a display screen consisting of 400×300 pixels. Moreover, below the LCD 10, a group of key switches 221 to 226 used for operating the digital camera 1 and a power switch 227 are installed. Here, the key switch 224 also serves as an enlarged display button, the key switch 225 also serves as an AF cursor button for displaying an AF cursor CR corresponding to a focused point on the LCD 10, and the key switch 226 also serves as a menu button. On the left side of the power switch 227, an LED 228 that is lit up when the power switch is on and an LED 229 for displaying the fact that an access is being made to a memory card are placed.

Figure 3:
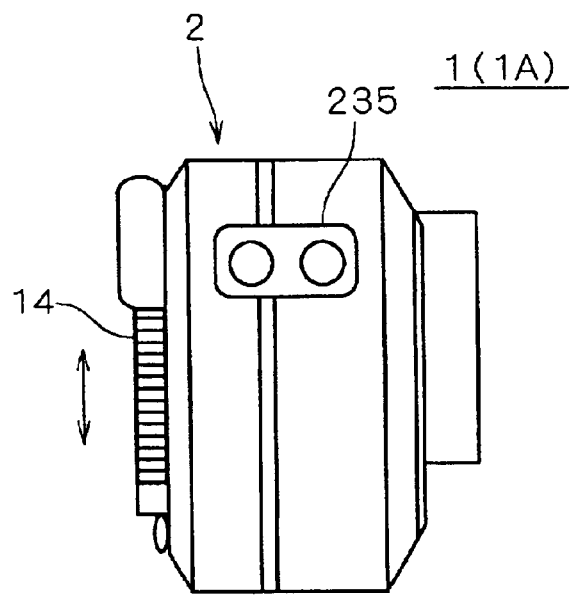
FIG. 3 is a side view of the digital camera.

Moreover, on the rear face of the camera main body 2, a mode setting switch 14 for switching modes among "image-pickup mode", "reproduction mode" and "preference mode" is placed (see FIG. 3). The image-pickup mode is a mode in which an image-pickup operation is carried out, the reproduction mode is a mode in which picked-up images recorded on a memory card are reproduced and displayed on the LCD 10, and the preference mode is a mode in which various settings are carried out by making selections among displayed items (set items).

The mode setting switch 14 is a slide switch having three contacts, and in FIG. 2, when this is set downward, the image-pickup mode is set, when set in the middle, the reproduction mode is set, and when set upward, the preference mode is set.

Moreover, on the right side of the camera rear face, quadruple switch 230 is placed, and in the image-pickup mode, by pressing buttons 231, 232, the focal length of the zoom lens 301 is changed so that the zooming process for altering the zoom magnification is carried out, and the manual exposure correcting process is carried out by pressing buttons 233, 234.

As illustrated in FIG. 2, on the rear face of the image-pickup unit 3, an LCD button 321 for turning on and off the LCD 10 and a macro button 322 are placed. When the LCD button is pressed, the LCD display is on/off switched. For example, in the case when an image-pickup process is carried out by using only the optical finder 31, the LCD display is turned off in order to cut power consumption. At the time of a macro image-pickup process, the macro button 322 is pressed so that an AF motor 308 (see FIG. 5) is driven so as to make the zoom lens 301 ready for a macro image-pickup operation.

As illustrated in FIG. 3, a DC input terminal 235 is provided on the side face of the camera main body 2.

Figure 4:
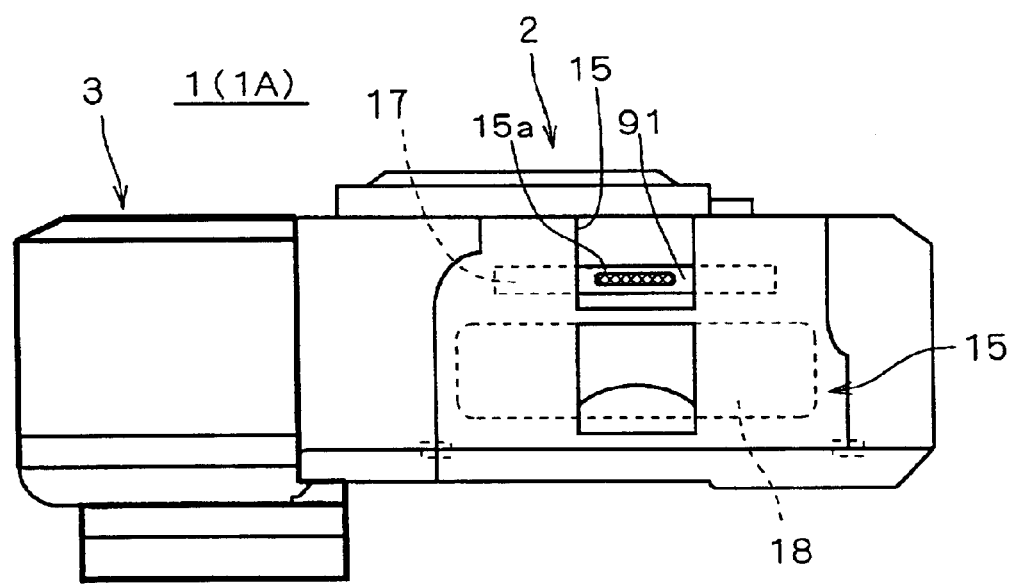
FIG. 4 is a bottom view of the digital camera.

As illustrated in FIG. 4, on the bottom face of the camera main body 2, a battery housing chamber 18 and a card insertion chamber 17 (card slot section) are installed. A memory card 91, a modem card 92 and the like are inserted in the card insertion chamber 17. The card insertion chamber 17 is freely opened and closed by using a clam-shell-type lid 15.

An opening 15a is formed in the lid 15 so that when a modem card 92 is attached, a connector portion for modem card communication is exposed to outside with the lid 15 being closed. Thus, even with the lid 15 being closed, it is possible to make a connection to an external device.

In the digital camera 1, by inserting four size AA batteries into the battery housing chamber 18, a power-supply battery 236 (see FIG. 5), formed by series-connecting these batteries, is used as a power supply source. Of course, power may be supplied from an adapter through a DC input terminal shown in FIG. 4.

Next, referring to FIG. 5, an explanation will be successively given of the inner structure of the image-pickup unit 3.

The image-pickup circuit 302 carries out a photo-electric conversion on a light image of a subject converged on the CCD 303 through the zoom lens 301, by using the CCD 303, and outputs the image as image signals (signals consisting of signal trains of pixel signals received as light in the respective pixels) of color components, R(red), G(green) and B(blue). Here, the CCD 303 has pixels of 1600×1200.

Here, since the digital camera 1 has a fixed diaphragm, the exposure control in the image-pickup unit 3 is carried out by adjusting the value of exposure of CCD 303 (charge storage time of CCD 303 corresponding to the shutter speed). In the case when an appropriate shutter speed cannot be set due to low luminance of a subject, the inappropriate exposing process due to an insufficient exposure is corrected by executing the level adjustment of the image signal released from the CCD 303. In other words, at the time of low luminance, the exposure control is carried out by combining the shutter speed and gain adjustment. Here, the level adjustment of the image signal is carried out by an AGC (auto gain control) circuit within a signal processing circuit 313 that will be described later. The photometric process in this automatic exposure (AE) will be described later.

A timing generator 314 is a device in which based upon a clock sent from the timing control circuit 202 inside the camera main body 2, a driving control signal for the CCD 303 is generated. The timing generator 314 generates clock signals such as a timing signal for start/end of integration (that is, start/end of exposure) and reading control signals of light-receiving signals from the respective pixels (horizontal synchronous signal, vertical synchronous signal, transfer signal, etc.), and outputs these to the CCD 303.

The signal processing circuit 313 carries out a predetermined analog signal process on an image signal (analog signal) outputted from the image-pickup circuit 302. The signal processing circuit 313, which is not shown, is provided with a CDS (correlated double sampling) circuit and an AGC circuit inside thereof, reduces noise from the image signal by the CDS circuit, and adjust the gain of the AGC circuit so that the image signal is level-adjusted.

The light-adjusting circuit 304 controls the amount of light emission of the built-in flash 5 at the time of a flash image-pickup operation to a predetermined amount of light emission that is set by an entire-system control unit 211 of the camera main body 2. In the case of the flash image-pickup operation, simultaneously with the start of exposure, reflected light of the flash light from the subject is received by the light-adjusting sensor 305, and when this amount of received light has reached a predetermined amount of light emission, the light-adjusting circuit 304 outputs a flashing stop signal to a flash control circuit 214 of the camera main body 2 through the entire-system control unit 211. In response to this flashing stop signal, the flash control circuit 214 forcefully stops the flashing of the built-in flash 5, thereby controlling the amount of light emission of the built-in flash 5 to a predetermined amount of light emission.

Moreover, a zoom monitor 307 for altering the zoom ratio of the zoom lens 301 and for shifting the lens between its housing position and an image pickup position and an AF (auto focus) motor 308 for carrying out a focusing operation are installed inside the image-pickup unit 3.

Next, an explanation will be given of the inner structure of the camera main body 2.

The entire-system control unit 211, which is mainly constituted by a CPU, controls the driving operations of respective peripheral constructions inside the above-mentioned image-pickup unit 3 and the camera main body 2 that are connected by address buses, data buses and control buses so that it systematically controls the image-pickup operations of the digital camera 1.

Here, for convenience of explanation, a flow of image data in FIG. 5 (and FIG. 6 that will be described later) is indicated by arrows between the peripheral constructions; however, in fact, the image data is sent to each of the peripheral constructions through the entire-system control unit 211. Moreover, inside the entire-system control unit 211, a work RAM 211 a constituted by a DRAM and a flash ROM 211b for storing programs are installed.

Next, an explanation will be given of a construction for processing image signals and for displaying images inside the camera main body 2.

Figure 6:
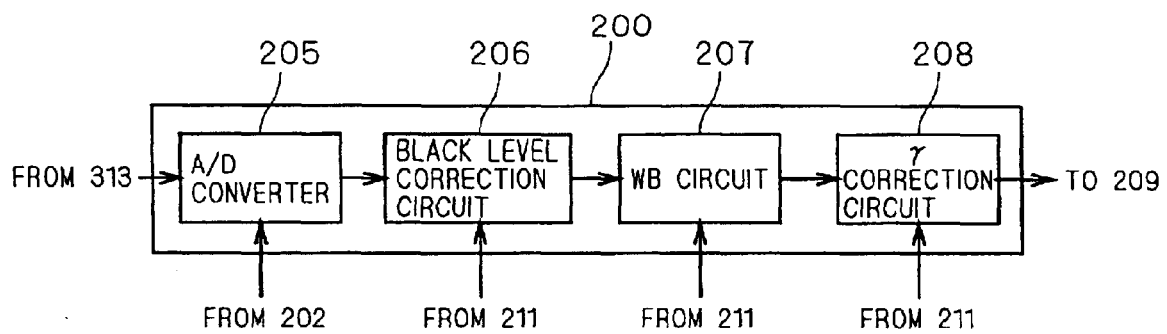
FIG. 6 is a block diagram that shows a construction of an image processing unit.

An analog image signal, sent from the signal processing circuit 313 of the image-pickup unit 3, is subjected to various image processes in an image processing unit 200 inside the camera main body 2. FIG. 6 is a block diagram that shows the construction of the image processing unit 200. First, an analog image signal sent to the image processing unit 200 is converted to a digital signal of 10 bits for each pixel in an A/D converter 205. Based upon a clock for A/D conversion inputted from the timing control circuit 202, the A/D converter 205 converts each pixel signal (analog signal) to a digital signal of 10 bits.

Here, the timing control circuit 202, controlled by the entire-system control unit 211, is allowed to generate a reference clock and clocks for a timing generator 314 and the A/D converter 205.

A black-level correction circuit 206 corrects the black level of a pixel signal that has been A/D converted (hereinafter, referred to as "pixel data"), to a reference black level. Moreover, a WB circuit 207, which carries out a level conversion on pixel data of each of color components, R, G, B, executes an automatic adjusting (AWB) operation of white balance in which γ-correction, which will be executed in a succeeding process, is taken into consideration. The white balance adjustment is carried out based upon a level conversion table (more exactly, the data thereof) that is inputted to the WB circuit 207 from the entire-system control unit 211, and the conversion coefficient (gradient of the characteristic) of each of the color components on the level conversion table is set for each picked-up image by the entire-system control unit 211. The adjustment of the white balance will be described later in detail.

A γ-correction circuit 208 is used for correcting the γ-characteristic of image data. The output from the γ-correction circuit 208 is sent to an image memory 209 as illustrated in FIG. 5.

The image memory 209 is a memory for storing pixel data outputted from the image processing unit 200, and has a storage capacity corresponding to one frame. In other words, in the case when the CCD 303 has pixels arranged in a matrix format of 1600×1200, the image memory 209 has a storage capacity of pixel data corresponding to 1600×1200 pixels, and respective pixel data are stored in the corresponding storage areas (addresses).

A VRAM 210 is a buffer memory for image data that is to be reproduced and displayed on the LCD 10. The VRAM 210 has a storage capacity of image data corresponding to 400×300 pixels of LCD 10, that is, a capacity corresponding to 400×300 pixels.

With this arrangement, at the time of an image-pickup stand-by state in the image-pickup mode, respective pixel data of images that have been picked up by the image-pickup unit 3 with predetermined intervals are processed by the image-processing unit 200, and stored in the image memory 209, and also transferred to the VRAM 210 through the entire-system control unit 211, and displayed on the LCD 10. Thus, an image of a subject prior to an image-pickup operation is displayed on the LCD 10 in a manner of moving-picture images, that is, a live view display is carried out.

Figure 8:
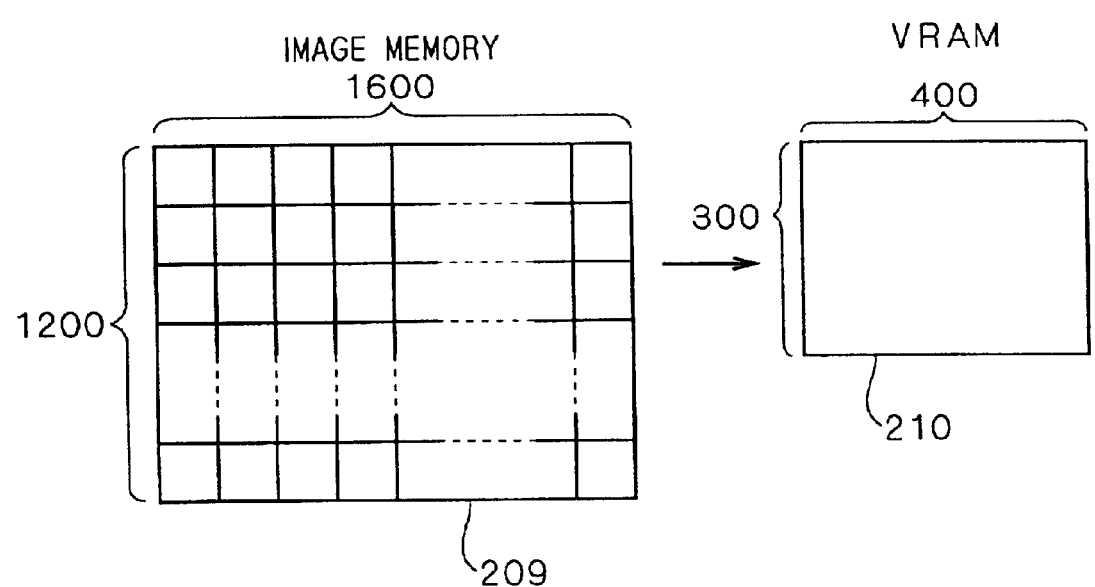
FIG. 8 is a drawing that explains a live-view display.

In other words, as illustrated in FIG. 8, in the live view display, image data within the image memory 209 of 1600× 1200 pixels are thinned longitudinally as well as laterally to ¼, and transferred to the VRAM 210 having 400×300 pixels. Moreover, when the enlarged display button 224 is depressed at this time, the image data corresponding to 400×300 pixels within the image memory 209 are cut out, and transferred to the VRAM 210, thereby making it possible to provide an enlarged display of 4 times in longitudinal and lateral directions.

In this manner, the depression of the enlarged display button 224 allows the shooter to easily switch the picked up image currently given by the CCD 303 to its enlarged image on the LCD 10.

Moreover, in the reproduction mode, after an image read from the memory card 91 has been subjected to a predetermined signal processing by the entire-system control unit 211, the resulting image is transferred to the VRAM 210, and reproduced and displayed on the LCD 10. Here, upon displaying an image on the LCD 10, a back light 16 is turned on by the control of the entire-system control unit 211.

Next, an explanation will be successively given of the other constructions inside the camera main body 2.

A card I/F 212 is an interface for passing and receiving signals to and from various functional cards inserted to the card insertion chamber 17. More specifically, image data is written on the memory card 91 or image data is read therefrom, and data input-output operations of the digital camera 1 are carried out to and from an external device through a modem card 92.

As described earlier, the flash control circuit 214 is a circuit for controlling flash light of the built-in flash 5. Based upon the control signal from the entire-system control unit 211, the flash control circuit 214 carries out controlling operations as to the presence or absence of flash light, the amount of light emission, the timing of light emission, etc. of the built-in flash 5, and based upon the flashing stop signal inputted from the light adjusting circuit 304, controls the amount of light emission of the built-in flash 5.

A clock circuit 219 is a time-counting circuit for managing the time and date of an image-pickup operation. This is driven by another power supply, not shown.

Moreover, a zoom motor driving circuit 215 and the AF motor driving circuit 216 for driving the zoom motor 307 and the AF motor 308 are installed inside the camera main body 2. These circuits carry out functions in response to the operations on the operation unit 250 given through the shutter button 8 and the other various switches and buttons.

For example, the shutter button 8 is a two-step switch that can detect a half-pressed state (S1) and a full-pressed state (S2), as is adopted in the silver halide camera, and when the shutter button 8 is half-pressed in the stand-by state, the AF motor driving circuit 216 drives the AF motor 308 so that the zoom lens 301 is shifted to a focusing position.

Moreover, when the buttons 231, 232 are pressed, signals from these buttons are sent to the entire-system control unit 211 so that based upon an instruction from the entire-system control unit 211, the zoom motor driving circuit 215 drives the zoom motor 307 so as to shift the zoom lens, thereby carrying out an optical zooming operation.

The above-mentioned description has discussed the respective constructions inside the camera main body 2; and in addition to data passing and receiving processes to and from the peripheral constructions and timing controls, the entire-system control unit 211 carries out various other functions on a software basis.

For example, the entire-system control unit 211 is provided with a luminance determining function and a shutter-speed setting function for setting an exposure control value (shutter speed). The luminance determining function refers to a function in which in the image-pickup stand-by state, by utilizing images that have been acquired by the CCD 303 every $\frac{1}{30}$ second, and stored in the image memory 209, the luminance of a subject is determined. The shutter-speed setting function refers to a function in which, based upon the result of determination as to the luminance of the subject by the luminance determination, the shutter speed (integral action time of CCD 303) is set.

Moreover, the entire-system control unit 211 is provided with a filtering process function, a recording image generating function and a reproduced image generating function so as to carry out recording processes on picked-up images.

The filtering process function refers to a function in which high-frequency components of an image to be recorded are corrected by a digital filter so as to carry out an image-quality correction relating to the outline portions.

The recording image generating function refers to a function in which image data is read out from the image memory 209 so as to generate a thumb-nail image and a compressed image to be recorded in the memory card 91. More specifically, while scanning the image memory 209 in a raster scanning direction, pixel data is read out every 8 image pixels in the respective lateral and longitudinal directions, and successively transferred to the memory card 91 so that, while generating a thumb nail image, this is also recorded in the memory card 91. Moreover, upon recording compressed image data onto the memory card 91, all the pixel data are read out from the image memory 209, and after these image data have been subjected to a 2-dimensional DCT conversion, these are also subjected to a predetermined compressing process by a JPEG system such as Huffman coding process, etc., and then recorded on the memory card 91.

With respect to specific operations, in the image-pickup mode, when the shutter button 8 gives an instruction to pick up an image, after the instruction to pick up the image, a thumb nail image of the image taken in the image memory 209 and a compressed image compressed by the JPEG system based on a set compressing rate are generated, and both of the images are stored in the memory card 91 together with tag information relating to the picked-up image (information such as frame numbers, exposure value, shutter speed, compressing rate, the date of the image-pickup, data relating to on/off of flash at the time of the image pickup, scene information and the results of image determination). Here, the data format of the recording image will be described later.

Moreover, the reproduced image generating function is a function for data-decompressing a compressed image recorded in a memory card to generate a reproduced image. With respect to specific operations, when the mode setting switch 14 is set to a reproduction mode, the image data having the greatest frame number within the memory card is read out and subjected to data-decompression, and the resulting data is transferred to the VRAM 210. Thus, the image having the greatest frame number, that is, the image that was picked up most recently, is displayed on the LCD 10.

Figure 7:
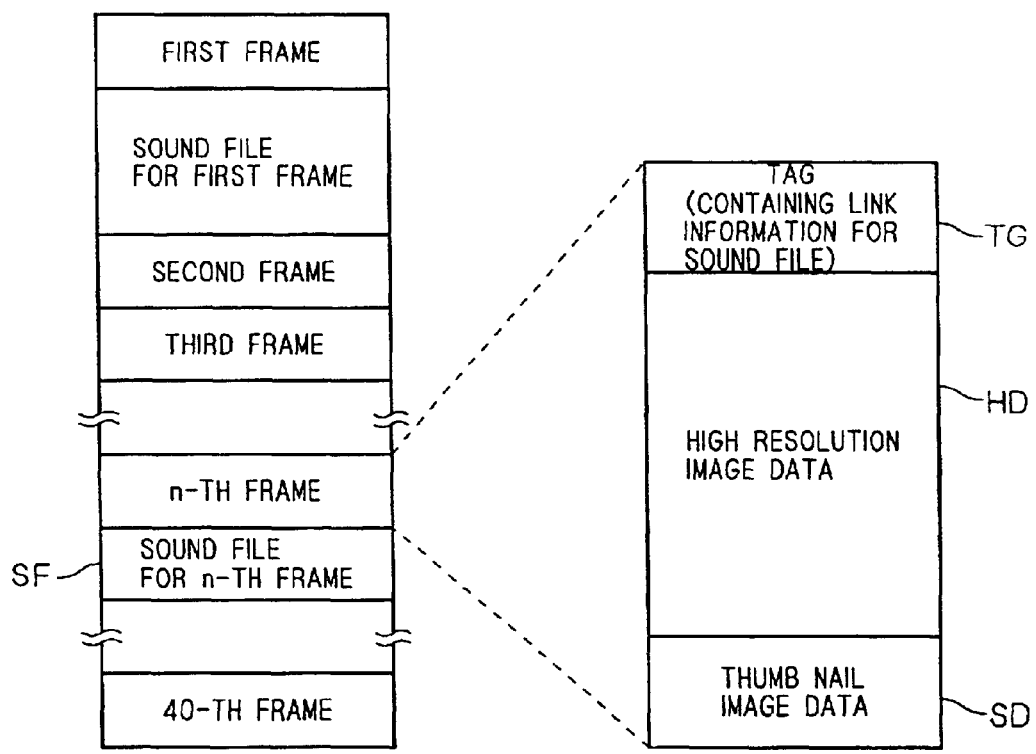
FIG. 7 is a drawing that shows a data arrangement in a memory card.

FIG. 7 is a drawing that shows a data arrangement in a memory card 91. This memory card 91 functions as a recording medium for mainly recording picked-up image data. As illustrated in FIG. 7, in the memory card 91, respective frames of images, recorded by the digital camera 1, are stored in a manner so as to be successively aligned. Moreover, each frame has tag information TG, high-resolution image data HD ((1600×1200) pixels) compressed by JPEG format and thumb nail image data SD ((80×60) pixels) used for thumb nail display, which are recorded therein. Moreover, the image data capacity corresponding to one frame is set to approximately 1 MB. Furthermore, this digital camera is allowed to also record sound files by inserting a sound card. Thus, link information (the leading address of the stored area) to the sound file is written in the tag TG of the image file so that the sound file SF is stored on the address indicated by the link information and thereafter.

<Concerning AF>

In the digital camera 1, an AF cursor corresponding to the AF area is displayed on the LCD 10, and the following description will discuss this area.

Figure 9:
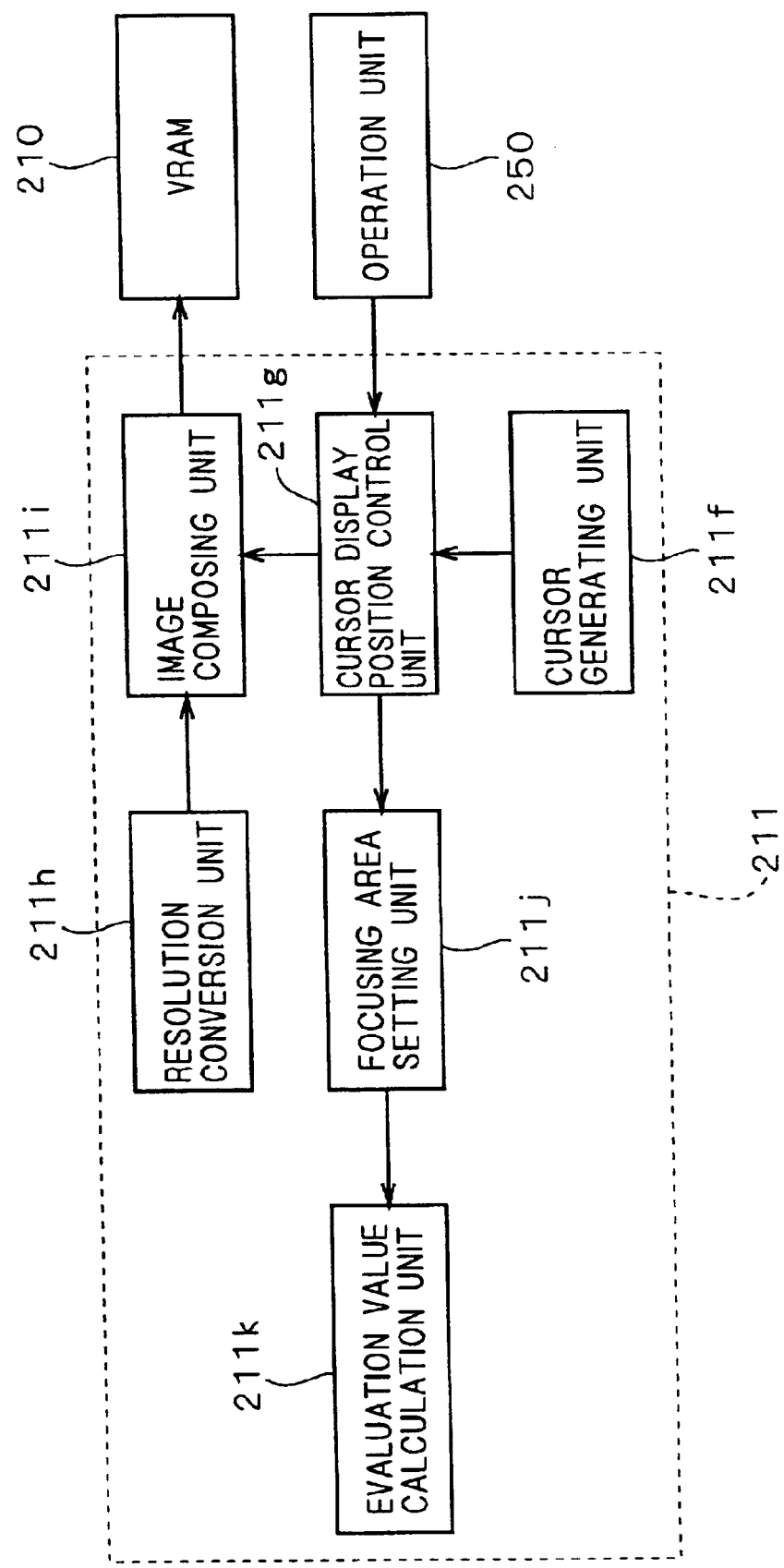
FIG. 9 is a partial block diagram of the digital camera.

FIG. 9 is a block diagram that partially shows the digital camera 1.

The entire-system control unit 211 is provided with a cursor generation unit 211f, a cursor display position control unit 211g, a resolution conversion unit 211h, an image composing unit 211i, a focusing area setting unit 211j and an evaluation value calculation unit 211k.

Figure 15:
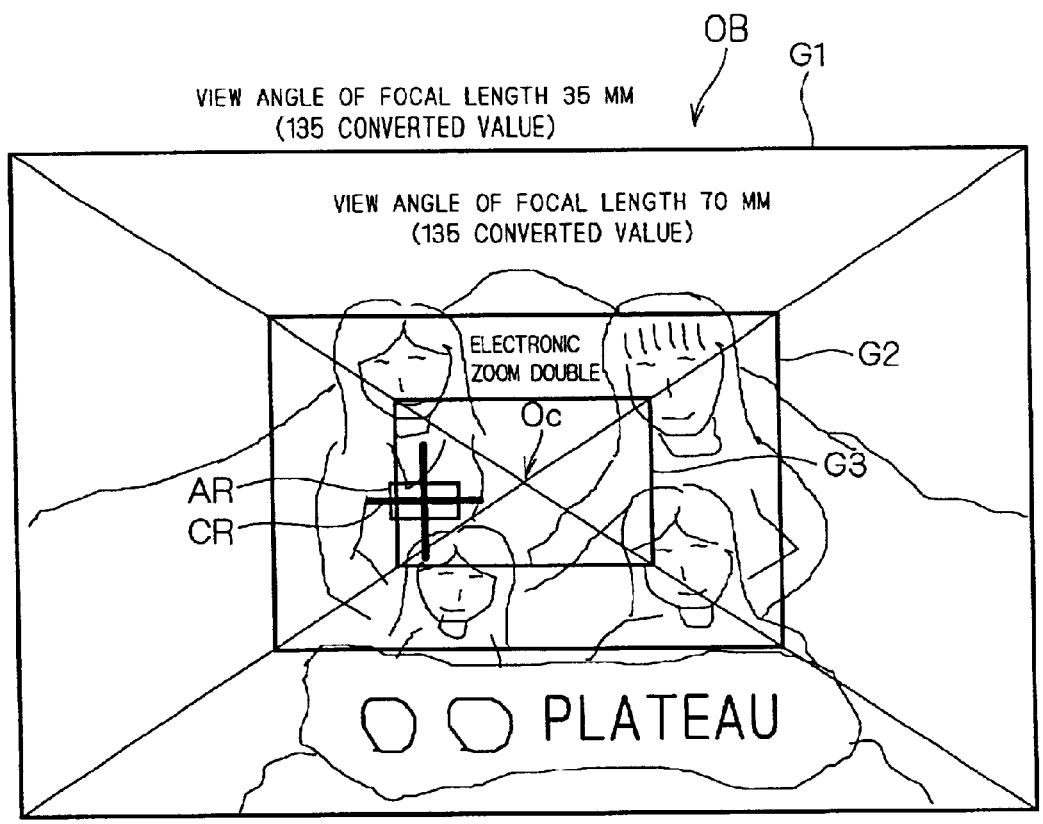
FIG. 15 is a drawing that explains a zooming operation in the digital camera.

In the LCD 10, the cursor generation unit 211f reads out cursor data from the flash ROM 211b so as to generate an AF cursor CR shown in FIG. 15, and transfers it to a cursor display position control unit 211g. Here, the cursor CR has a cross shape, and its size is set to 16×16 pixels on the LCD 10.

Based upon an operation input on the operation unit 250 by the shooter, the cursor display position control unit 211g alters the display position of the AF cursor CR on the LCD 10.

As described earlier, in the normal display state, the resolution conversion unit 211h sends image data formed by thinning image data acquired by the CCD 303 into ¼ to the image composing unit 211i, and in the enlarged display state, it transfers one portion of image data acquired by the CCD 303 to the image composing unit 211i, as it is.

In the image composing unit 211i, the image inputted from the resolution conversion unit 211h and the image of the AF cursor inputted from the cursor display position control unit 211g are composed, and transmitted to the VRAM 210. This composing operation makes the size of the AF cursor CR on the LCD 10 set to a constant size independent of the thinning rate in the resolution conversion unit 211h. This is also true for the case of the electronic zooming process.

The focusing area setting unit 211j sets an AF area AR that is utilized for focusing in accordance with the AF cursor CR on the screen of the LCD 10.

The evaluation value calculation unit 211k carries out an evaluation value calculating operation so as to carry out an AF operation in a contrast method, in the case when the shutter button 8 is in a half-pressed state (S1). In this case, with respect to the picked-up image data corresponding to the AF area AR which will be described later, the evaluation value is calculated as the sum of the absolute values of differences in the adjacent pixels. Then, the lens is driven, and the lens position having the highest evaluation value is set as a focusing position. Therefore, the zoom lens 301 is driven with respect to the AF area AR corresponding to the focusing point so as to carry out the focusing operation; thus, it is possible to bring a target main subject, etc. into focus.

<Concerning AE>

With respect to AE, based upon the position of the AF cursor CR on the screen of the LCD 10, an AE operation is carried out based upon the center-weighted photometry. In other words, the AF cursor CR also functions as the AE cursor corresponding to the photometric point.

Figure 10:
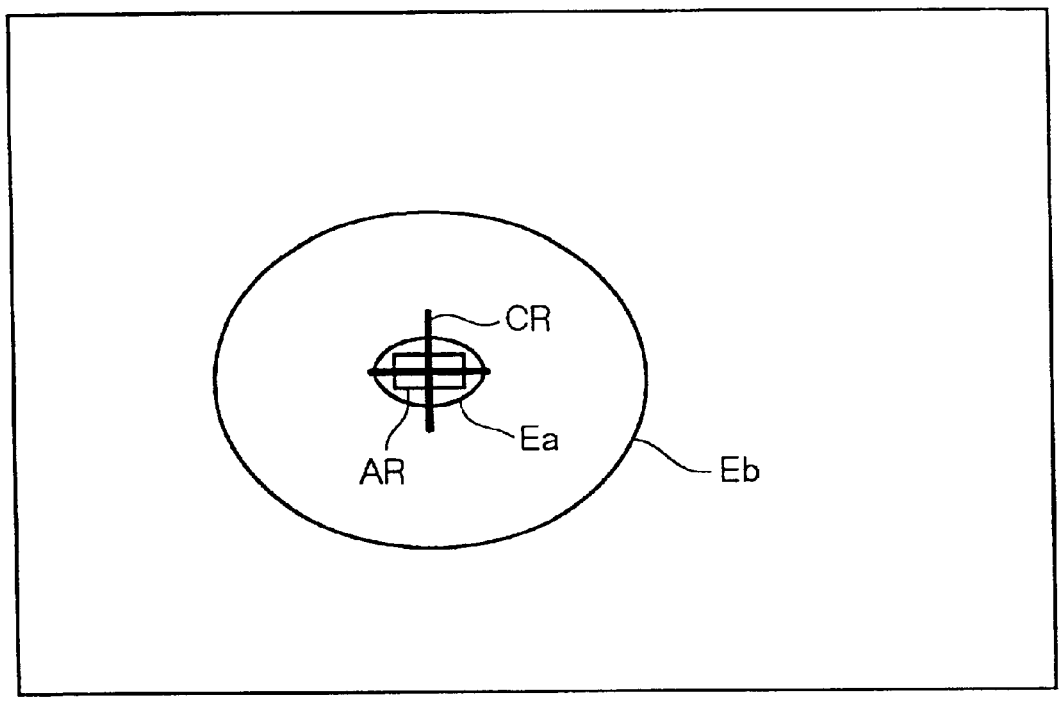
FIG. 10 is a drawing that explains a photometric process in the digital camera.

As illustrated in FIG. 10, in this photometric process, an ellipse Ea and an ellipse Eb serving as photometric areas are set centered on the AF cursor CR, and the inside of the ellipse Ea is set as, for example, a weighting coefficient 8, while the area from the ellipse Ea to the ellipse Eb is set as, for example, a weighting coefficient 2; thus, with respect to the image data acquired by the CCD 303, photometric calculations are carried out. Thus, an appropriate photometric operation aiming at the main subject is executed.

Figure 11:
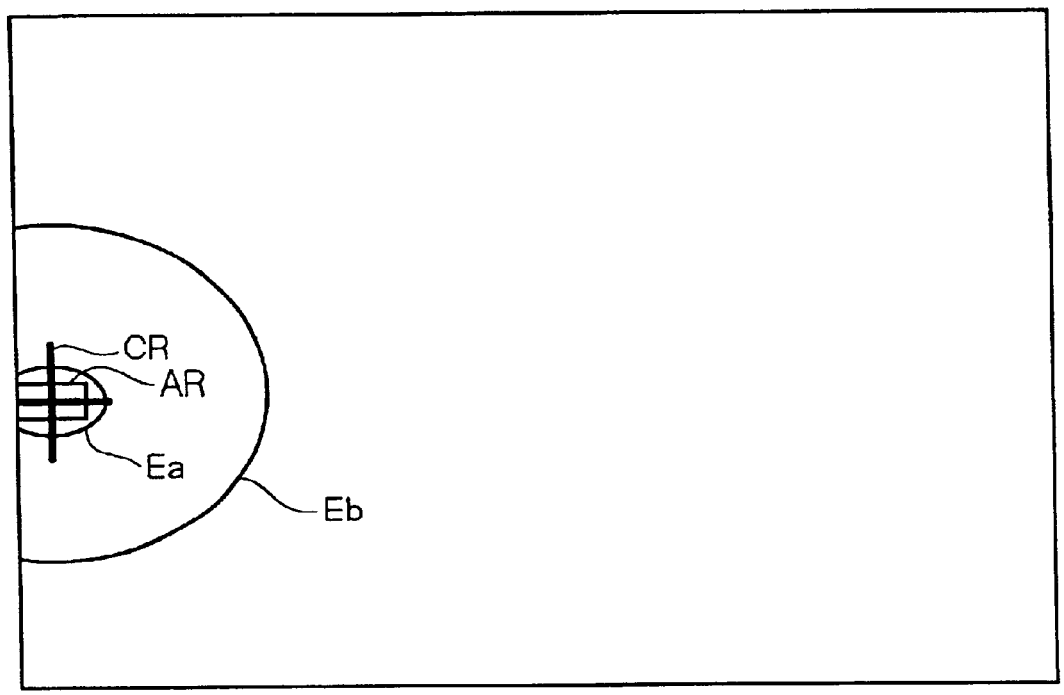
FIG. 11 is a drawing that explains the photometric process in the digital camera.

Here, for example, in the case when the main subject is located at the end of the screen, while the AF cursor CR is located at the edge of the screen as illustrated in FIG. 11, if the ellipses Ea and Eb using for the photometric operation are set centered on the AF cursor CR, one portion of the ellipses Ea, Eb is located out of the screen, the photometric operation has degradation in its balance.

Figure 12:
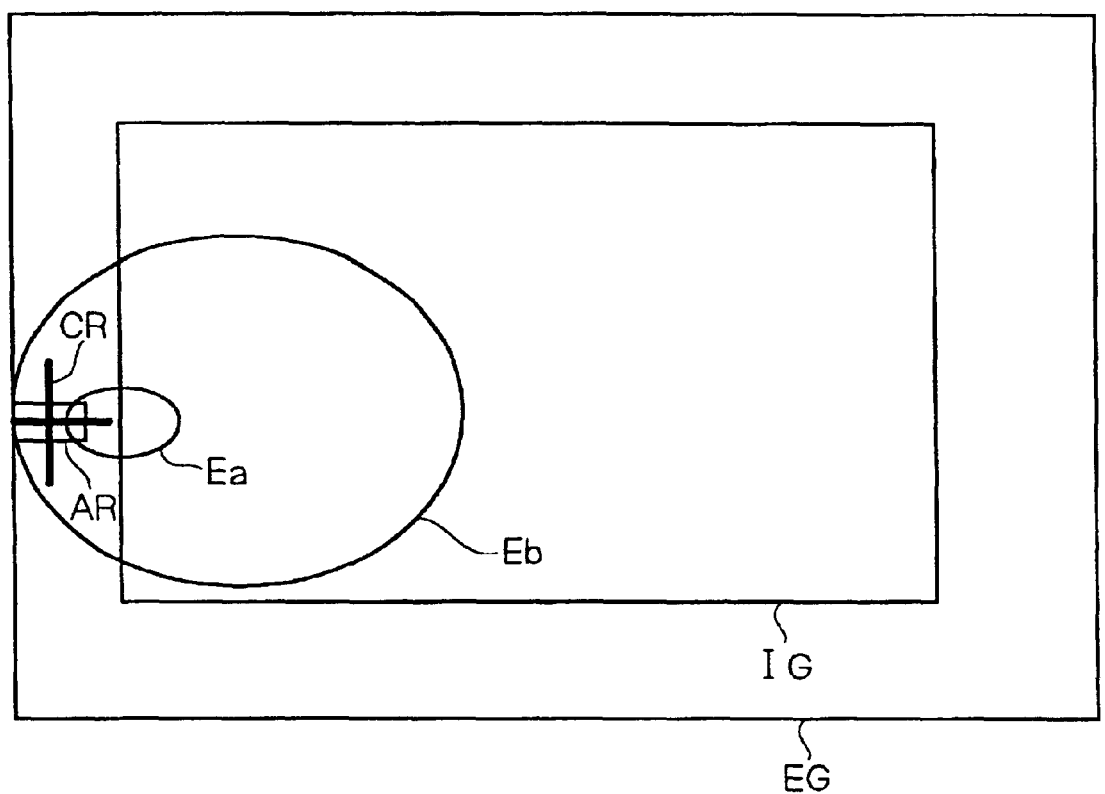
FIG. 12 is a drawing that explains the photometric process in the digital camera.

Therefore, as illustrated in FIG. 12, a limited area IG having a short rectangular shape is set in the center of the screen, and if the center of the AF cursor CR is located out of this limited area IG, the center of the ellipse Ea is shifted to the end of the limited area IG, while the ellipse Eb is shifted so as to contact the edge of the screen EG. In this manner, by shifting the center of the photometric area in the center direction of the screen from the AF cursor CR, it becomes possible to carry out a well-balanced photometric operation. Then, by using the results of this photometric operation, it is possible to carry out an appropriate exposing control operation.

<Concerning AWB>

The following description will discuss AWB more specifically.

Figure 13:
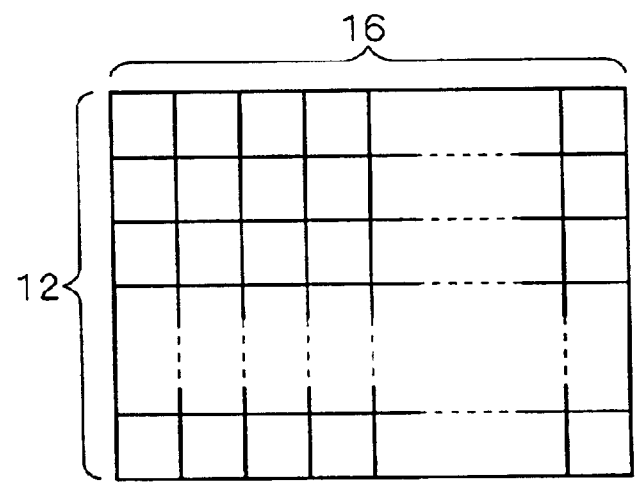
FIG. 13 is a drawing that explains white balance in the digital camera.

As illustrated in FIG. 13, the image data within the screen memory 209 is divided into blocks of 16×12, each having a size corresponding to 100×100 pixels.

Next, the respective pixel values of RGB are accumulated for each block, and these are set to Rbij, Gbij, Bbij ($1 \leq i \leq 12$, $1 \leq j \leq 16$). Then, as shown in the following equations (1) to (3), the sums of these blocks are respectively calculated and the values are represented by Rs, Gs and Bs. Then, as indicated by equation (4), Gs/Rs and Gs/Bs are found to set (gr, gb).

$$\begin{cases} Rs = \sum_{i=1}^{12} \sum_{j=1}^{16} Rbij & (1) \\ Gs = \sum_{i=1}^{12} \sum_{j=1}^{16} Gbij & (2) \\ Bs = \sum_{i=1}^{12} \sum_{j=1}^{16} Bbij & (3) \end{cases}$$

$$(gr, gb) = (Gs/Rs, Gs/Bs) \quad (4)$$

Next in the digital camera 1, depending on set conditions of white balance, such as incandescent lamp and daylight, (gr, gb) can be corrected.

Figure 14:
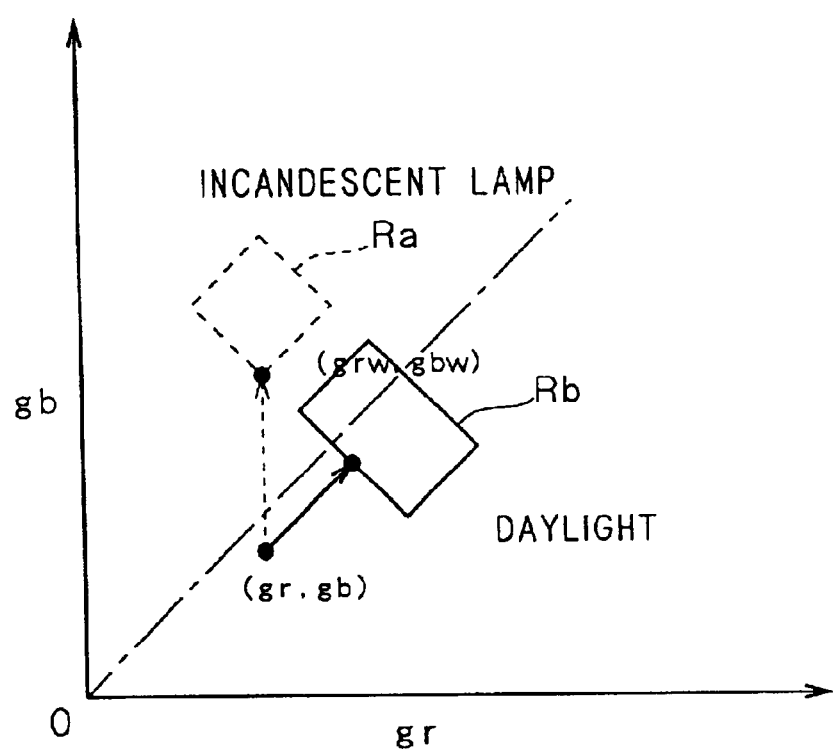
FIG. 14 is a drawing that explains white balance in the digital camera.

For example, as illustrated in FIG. 14, an area Ra related to incandescent lamp and an area Rb related to daylight are set, and (gr, gb) are shifted to the closest points to each of these areas. Here, in the case when (gr, gb) are located within each of the set areas, the values, as it is, are used. The white balance control value thus shifted are set as (grw, gbw), and by using these (grw, gbw), the values of RGB, (Rw, Gw, Bw)=(G/grw, G, G/gbw), are calculated; thus, by reflecting these values to the image data, the adjustment of white balance is carried out.

<Operation of Digital Camera 1>

The following description will discuss the operation of the digital camera 1. This operation is automatically carried out by the entire-system control unit 211.

First, an explanation will be given of a zoom operation in the digital camera 1.

FIG. 15 is a drawing that explains the zoom operation in the digital camera 1.

A screen G1 shows a state of a subject OB that is displayed on the LCD 10 in the case of a view angle with a focal length of 35 mm (converted to the case of 135) in the zoom lens 301.

Different from the screen G1 in the focal length, a screen G2 shows a state of the subject OB that is displayed on the LCD 10 in the case of a view angle with a focal length of 70 mm (converted to the case of 135) in the zoom lens 301. The screens G1, G2 are switched to each other by the operation of buttons 231, 232.

A screen G3 shows a state in which a subject is enlarged to double the size by an electronic zooming operation. In this electronic zooming operation, for example, the original image data having 1600×1200 pixels, acquired by the CCD 303, is trimmed to have 800×600 pixels, and recorded. In this case, the data corresponding to 800×600 pixels are thinned to ½, and displayed on the LCD 10.

In these alterations in the zooming magnification, the image is enlarged centered on the center Oc of the screen.

Moreover, in the respective screens G1 to G3, the AF cursor CR corresponding to the AF area AR is displayed by the depression of the AF cursor button 225.

Figure 16:
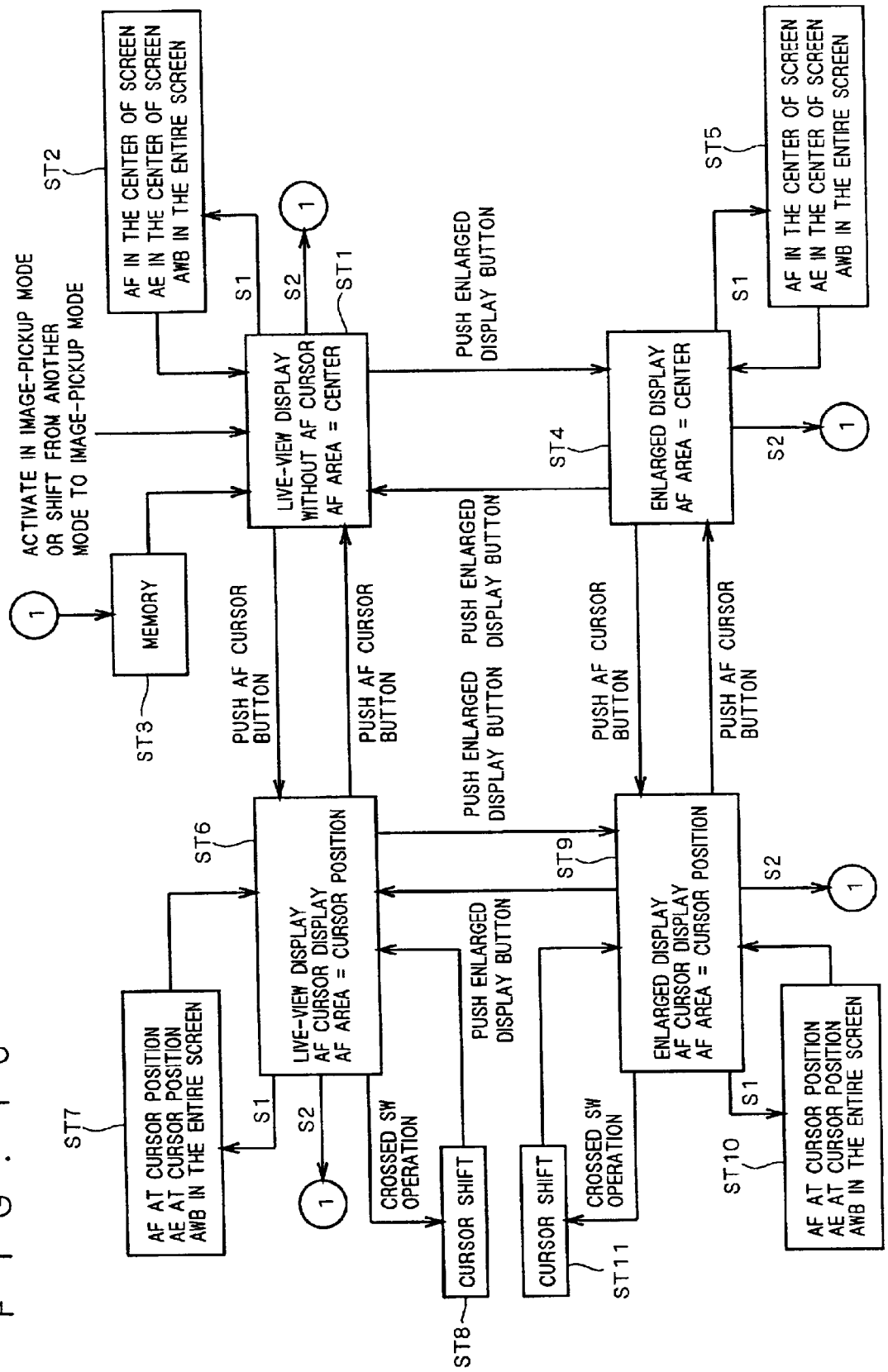
FIG. 16 is a transition diagram of states that shows basic operations in the camera.

FIG. 16 is a drawing that shows state transitions in a basic operation of the digital camera 1.

At state ST1, a live view display is given on the LCD 10, with the AF area AR being set in the center of the screen of the LCD 10 without displaying the AF cursor CR. Here, when the shutter button 8 is half-pressed (S1), the sequence proceeds to state ST2, and when the shutter button 8 is fully pressed (S2), the sequence proceeds to state ST3. Moreover, when the enlarged display button 224 is pressed, the sequence proceeds to state ST4, and when the AF cursor button 225 is pressed, the sequence proceeds to state ST6.

At state ST2, the AF and AE operations are carried out in the center of the screen of the LCD 10 while the AWB operation is carried out on the entire screen. Here, in this case, the entire screen represents not the entire display screen, but the entire image-pickup area. In the case when the shutter button 8 is released from the half-pressed state (S1), the sequence returns to state ST1.

At state ST3, picked-up image data is recorded in the memory card 91.

At state ST4, the subject OB is displayed in an enlarged manner centered on the center of the screen of the LCD 10. In this state also, in the same manner as state ST1, the AF area AR is set in the center of the screen with no AF cursor CR being displayed. In this case, when the shutter button 8 is half-pressed (S1), the sequence proceeds to state ST5, and when the shutter button 8 is fully pressed (S2), the sequence proceeds to state ST3. Moreover, when the enlarged display button 224 is pressed, the sequence proceeds to state ST1, and when the AF cursor button 225 is pressed, the sequence proceeds to state ST9.

At state ST5, in the same manner as state ST2, the AF and AE operations are carried out in the center of the screen of the LCD 10, and the AWB operation is carried out on the entire screen. Here, in the case when the shutter button 8 is released from the half-pressed state (S1), the sequence returns to state ST4.

Figure 17:
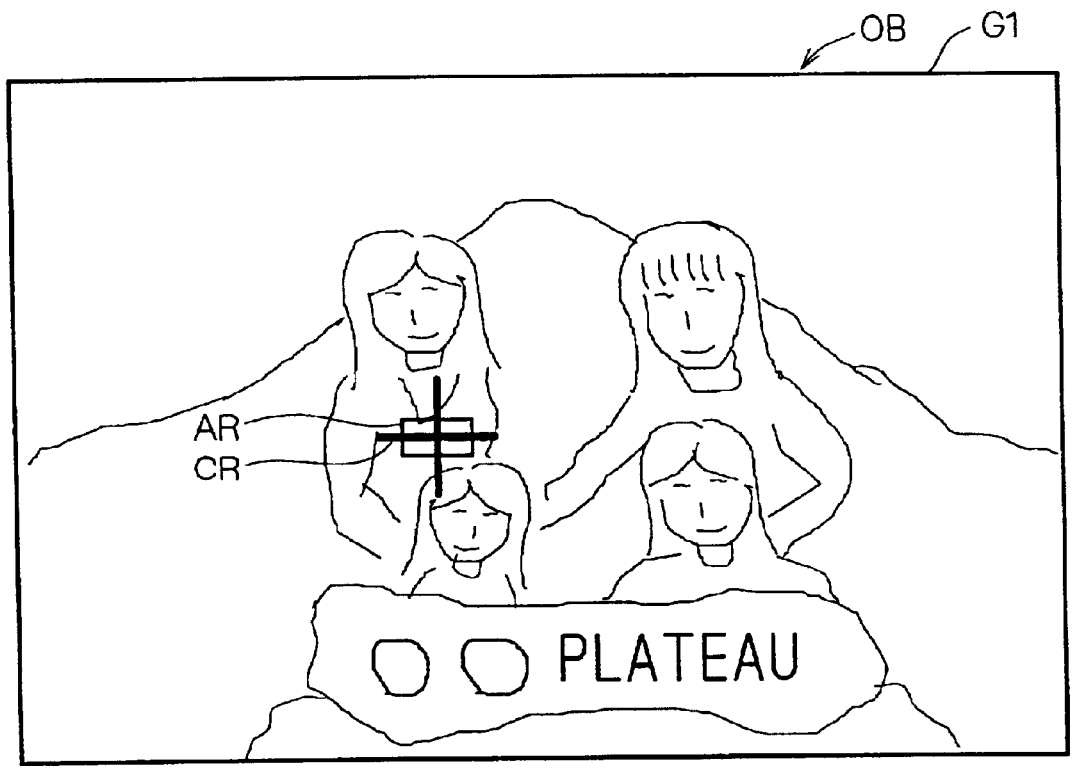
FIG. 17 is a drawing that explains a screen of LCD.

As illustrated in FIG. 17, at state ST6, the live view display related to the subject OB is carried out on the LCD 10, and the AF cursor CR is displayed on the screen of the LCD 10. Here, the center of the AF area AR is coincident with the center of the AF cursor CR.

In this case, when the shutter button 8 is half-pressed (S1), the sequence proceeds to state ST7, and when the shutter button 8 is fully pressed (S2), the sequence proceeds to state ST3. Moreover, the enlarged display button 224 is pressed, the sequence proceeds to state ST9, and when the AF cursor button 225 is pressed, the sequence proceeds to state ST1. Moreover, when the crossed switches 230 are operated, the sequence proceeds to state ST8.

Figure 18:
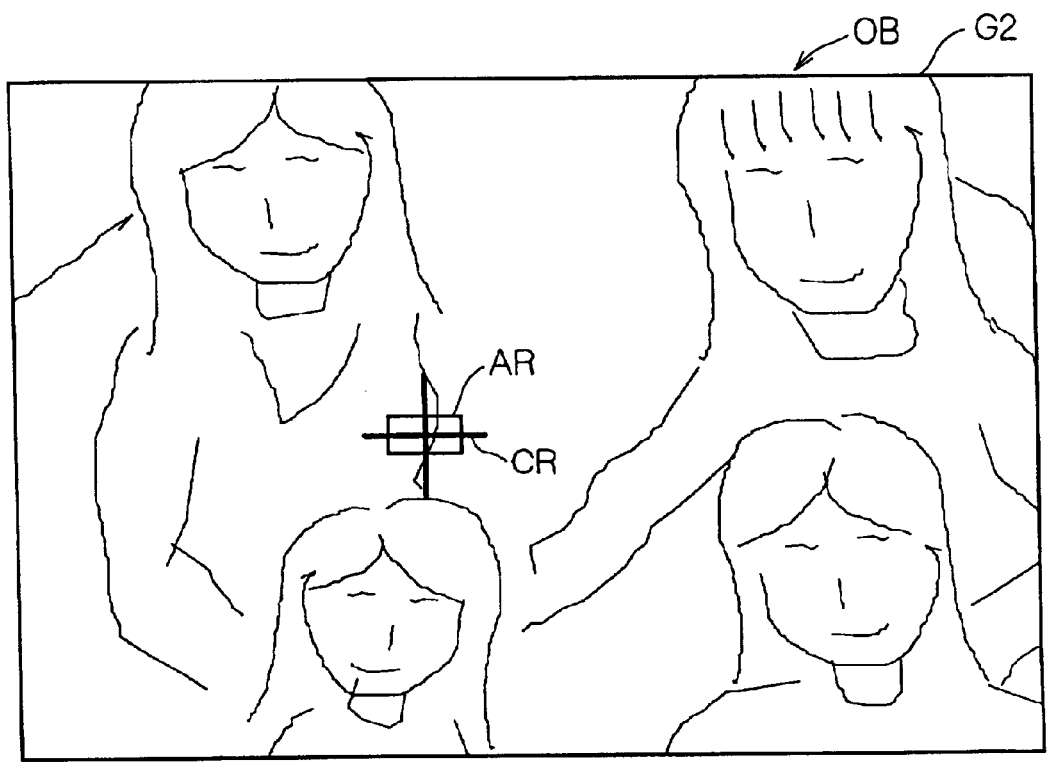
FIG. 18 is a drawing that explains a screen of LCD when optically zoomed.

At state ST6, in the case when the shooter specifies a zooming operation in which screen Gi shown in FIG. 15 is optically zoomed to screen G2, the subject OB is displayed on the LCD 10 as illustrated in FIG. 18. In this screen G2, the AF cursor CR is displayed while being held in the same position with the same size as screen G1.

Figure 19:
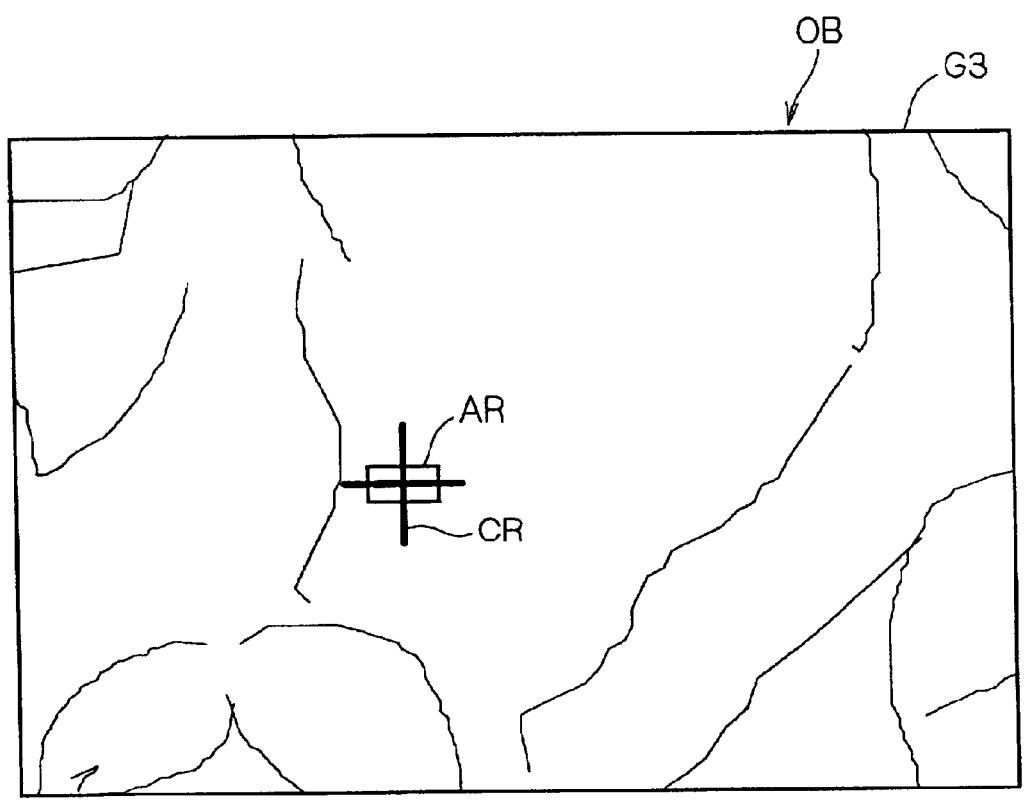
FIG. 19 is a drawing that explains a screen of LCD when electronically zoomed.

Moreover, in the case when the shooter specifies an electronic zooming operation in which the screen is zoomed to screen G3 shown in FIG. 19, the subject OB is displayed on the LCD 10 as illustrated in FIG. 19. In this screen G3 also, the AF cursor CR is displayed while being held in the same position with the same size as screens G1, G2.

In this manner, even when the zooming operation is carried out, since the position of the cursor CR is unchanged on the screen, the shooter is free from incongruous feelings in visibility, thereby making it possible to improve the operability of the digital camera 1.

At state ST7, the AF and AE operations are carried out at the AF cursor CR position on the screen of the LCD 10, the AWB operation is carried out on the entire screen independent of the position of the AF cursor CR. Here, in the case when the shutter button 8 is released from the half-pressed state (S1), the sequence returns to state ST6.

At state ST8, the AF cursor CR is shifted in the horizontal and vertical directions through the input operations in the crossed switches 230 by the shooter so that the focusing point is altered. Here, upon completion of the operation of the crossed switches 230, the sequence proceeds to state ST6.

Figure 20:
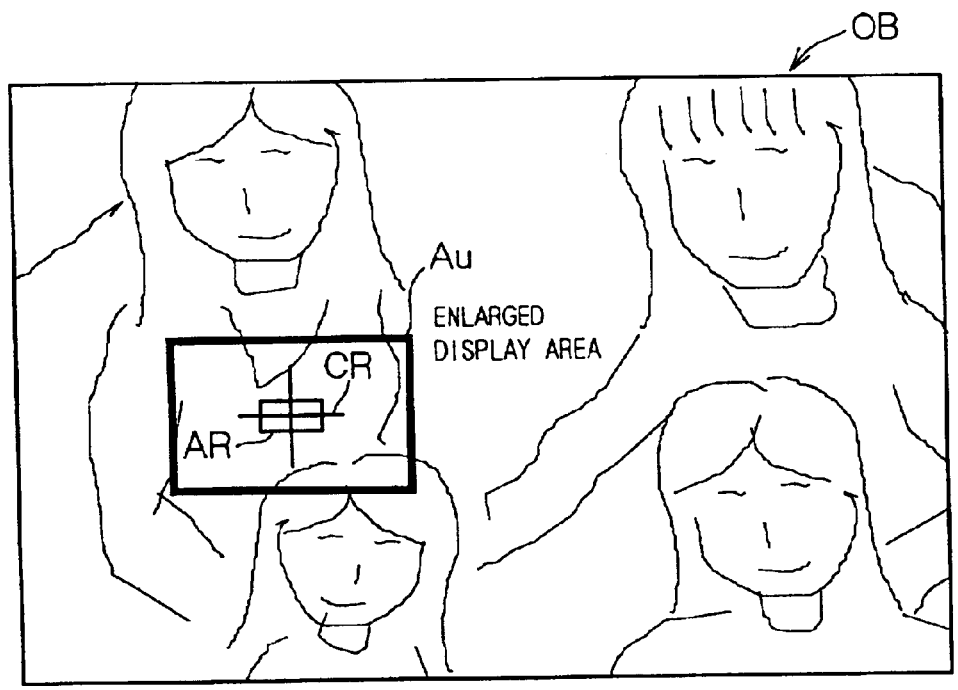
FIG. 20 is a drawing that explains an enlarged screen display.
Figure 21:
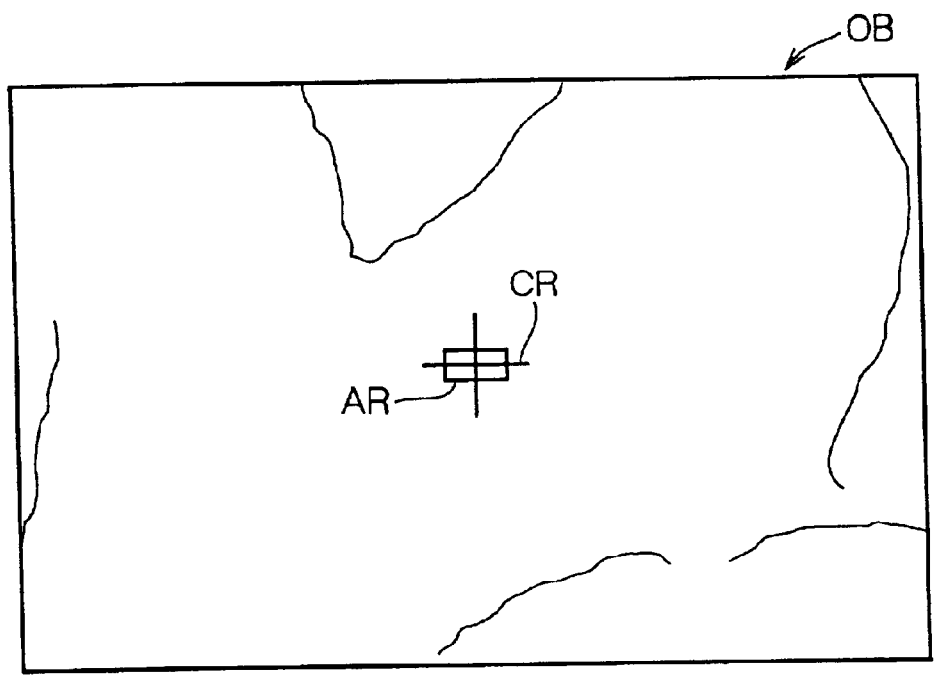
FIG. 21 is a drawing that explains an enlarged screen display.

At state ST9, an enlarged display area Au (FIG. 20), centered on the AF cursor CR, is displayed in an enlarged manner on the screen of the LCD 10, as illustrated in FIG. 21. This enlarged display area Au is set as an area having a short rectangular shape centered on the AF cursor CR, which includes the AF cursor CR. In this case, as illustrated in FIG. 9, since the cursor and the displayed image are composed in the image composing unit 211i, the size of the AF cursor CR is displayed in the same size as the size prior to the enlargement.

Figure 22:
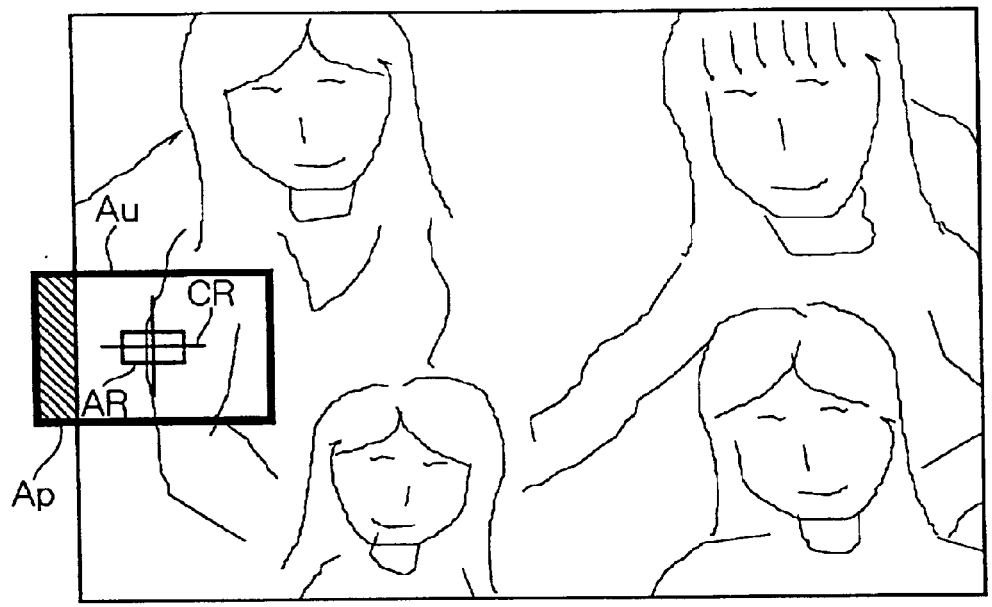
FIG. 22 is a drawing that explains an enlarged screen display.
Figure 23:
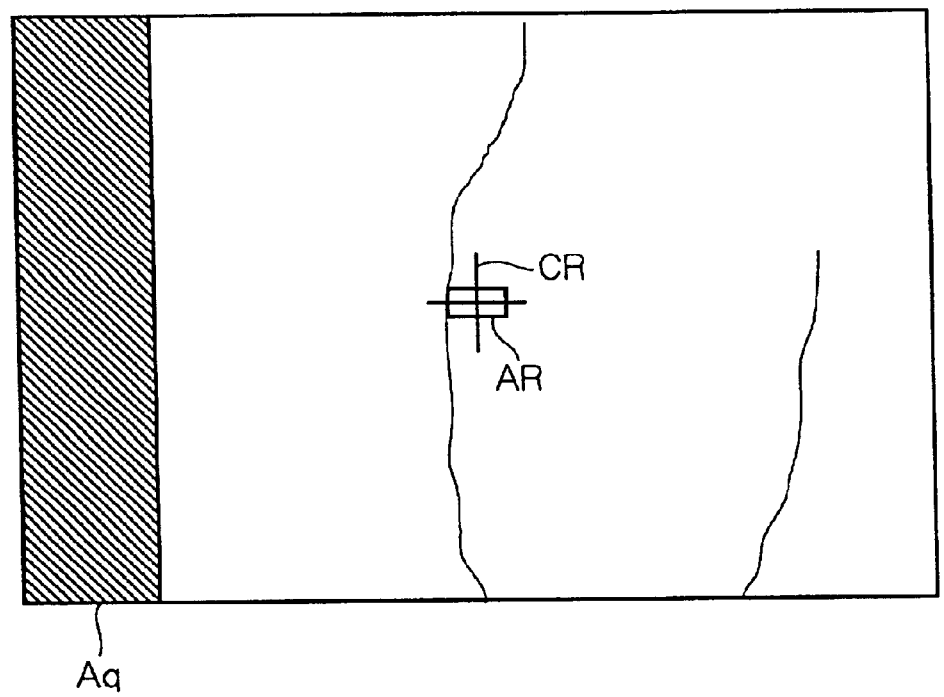
FIG. 23 is a drawing that explains an enlarged screen display.

At this state ST9, for example, as illustrated in FIG. 22, in the case when the AF cursor CR is located at the edge of the screen with the enlarged display area Au set centered on the AF cursor CR, since there is a portion sticking out from the screen, that is, an area Ap (portion indicated by parallel slanted lines) other than the image acquired by the CCD 303, the left portion Aq (portion indicated by parallel slanted lines) of the enlarged display screen corresponding this area Ap is displayed in a specific color such as a blue back area as illustrated in FIG. 23. Thus, it becomes possible to clearly indicate that there is an area that cannot be displayed by the enlarged display screen.

In this state ST9, when the shutter button 8 is half-pressed (S1), the sequence proceeds to state ST10, and when the shutter button 8 is fully pressed (S2), the sequence proceeds to state ST3. Moreover, when the enlarged display button 224 is pressed, the sequence proceeds to state ST6, and when the crossed switches 230 are operated, the sequence proceeds to state ST11.

At state ST10, the AF and AE operations are carried out at the AF cursor CR position on the screen of the LCD 10, and the AWB operation is carried out on the entire screen independent of the position of the AF cursor CR. In this manner, since the AF operation is carried out in response to the directive input operation of the shutter button 8 in a state where the enlarged display is operative, it is possible to confirm the result of a focusing operation while viewing the subject in detail. Here, when the shutter button 8 is released from the half-pressed state (S1), the sequence proceeds to state ST9.

At state ST11, the AF cursor CR is shifted in the horizontal and vertical directions by the operation of the crossed switches 230 carried out by the shooter. In this case, the shift of the AF cursor CR is limited to the inside of the screen. In the case when the AF cursor CR reaches the end of the screen, the enlarged display area Au related to the subject may be shifted and displayed in a manner so as to follow the AF cursor in its shifting direction.

Upon completion of the crossed switches 230, the sequence proceeds to state ST9.

The above-mentioned operations of the digital camera 1 make it possible to improve the operability in specifying processes of items, such as the AF cursor.

Here, at step ST9 as described above, the enlarged display screen may be displayed as described below.

Figure 24:
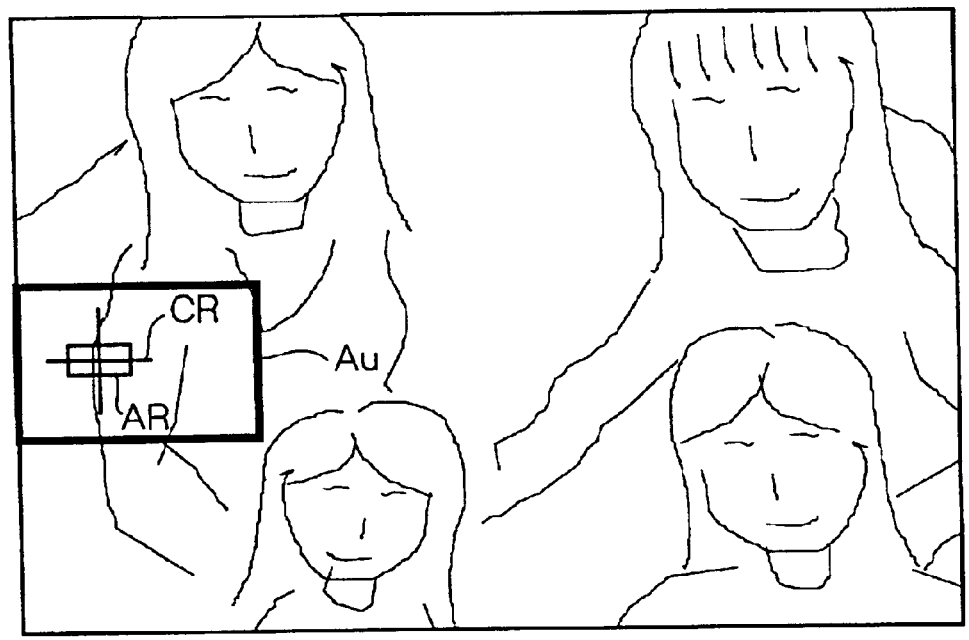
FIG. 24 is a drawing that explains an enlarged screen display.
Figure 25:
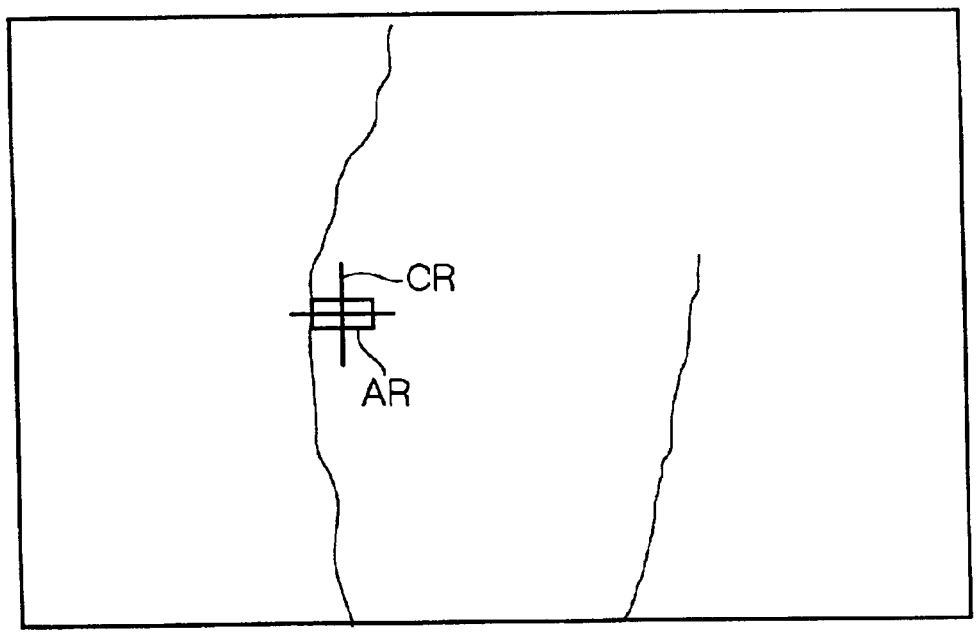
FIG. 25 is a drawing that explains an enlarged screen display.

In the case when the enlarged display area Au is determined, centered on the AF cursor CR, if this area sticks out of the screen, the enlarged display area may be set in a manner so as not to be centered on the AF cursor CR, but to allow the end of the enlarged display area Au to coincide with the end of a picked-up image, as illustrated in FIG. 24. Thus, an enlarged display as shown in FIG. 25 is given, making it possible to eliminate the necessity of displaying the non-displayable portion in a specific color.

Figure 26:
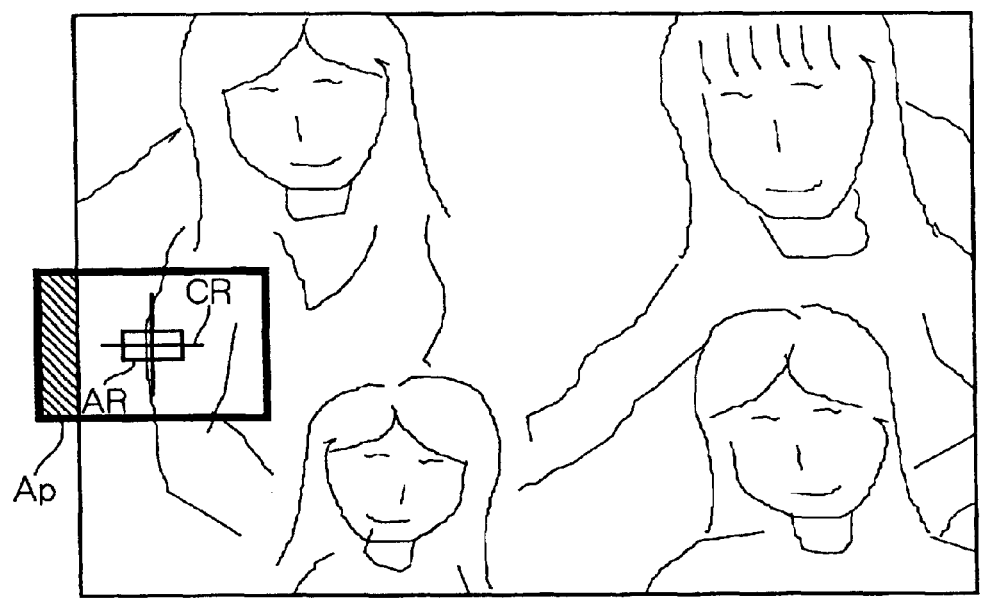
FIG. 26 is a drawing that explains an enlarged screen display.
Figure 27:
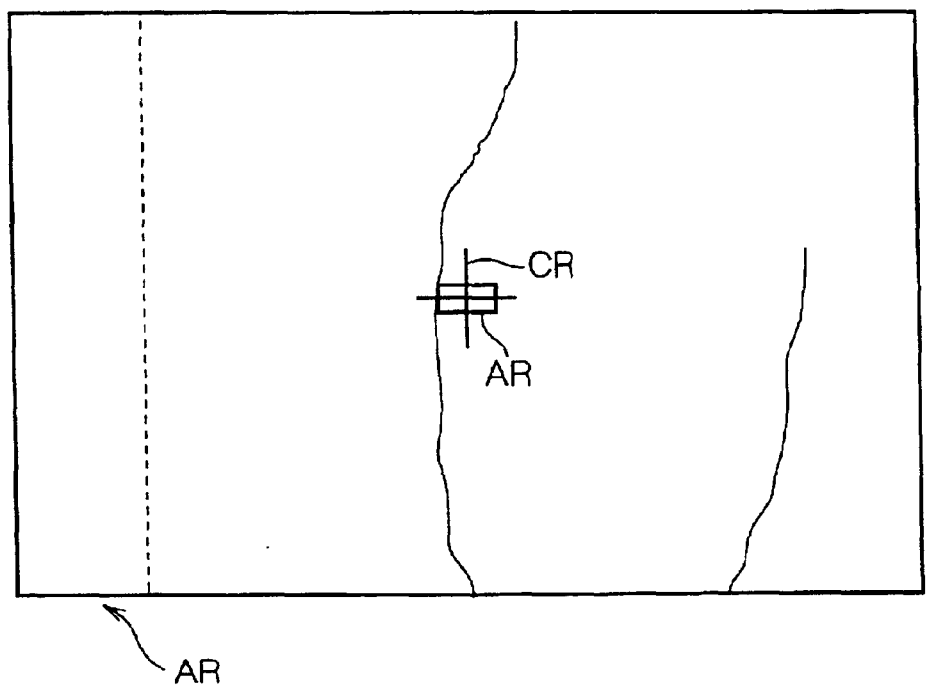
FIG. 27 is a drawing that explains a n enlarged screen display.

Moreover, in the case when an enlarged display is given from the screen that has been zoomed up by the electronic zooming operation, if the enlarged display area Au is set centered on the AF cursor CR as illustrated in FIG. 26, a portion Ap sticking out of the display screen appears; however, by utilizing the original image data acquired by the CCD 303 prior to the trimming process by the electronic zooming operation, the image data of the sticking-out portion Ap is interpolated so that as illustrated in FIG. 27, the portion Ar corresponding to the area Ap shown in FIG. 26 can be displayed on the screen. Consequently, even in the case when the AF cursor CR is positioned at the end of the screen, the AF cursor CR is displayed in the center of the enlarged display screen, thereby making it possible to improve the visibility.

<Second Preferred Embodiment>

A digital camera 1A according to the second preferred embodiment has a construction similar to that of the digital camera 1 in the first preferred embodiment; however, it is different in the construction of an entire-system control unit 211A that executes the operations described below.

<Operation of Digital Camera 1A>

A digital camera 1A carries out the same operations as the digital camera 1 in the first preferred embodiment that has explained by reference to FIG. 16, and an operation, which allows the AF cursor CR to be constant with respect to a subject even in the case when the zooming magnification is altered, is added thereto.

Figure 28:
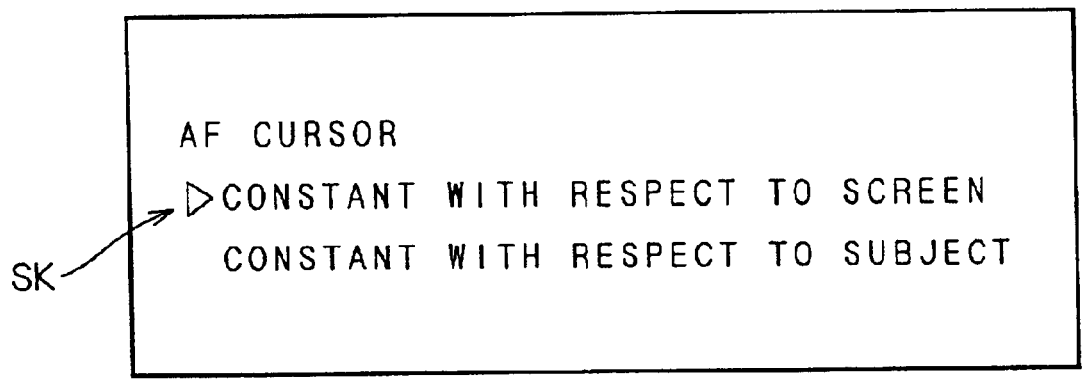
FIG. 28 is a drawing that shows a selected screen with respect to AF cursor.

In this digital camera 1A, a selection screen related to the AF cursor as shown in FIG. 28 is displayed by pressing the menu button 226; and when "constant with respect to the screen" is selected by specifying a selection cursor SK, the position of the AF cursor CR is maintained with respect to the screen, independent of the zooming magnification in the same manner as the first preferred embodiment. Moreover, when "constant with respect to the subject" is selected, the position of the AF cursor CR is maintained with respect to the subject. In this manner, by shifting the selection cursor SK up and down, it is possible to switch functions of the AF cursor CR.

The following description will discuss the operation for allowing the AF cursor CR to be constant with respect to the subject independent of the zooming magnification.

Figure 29:
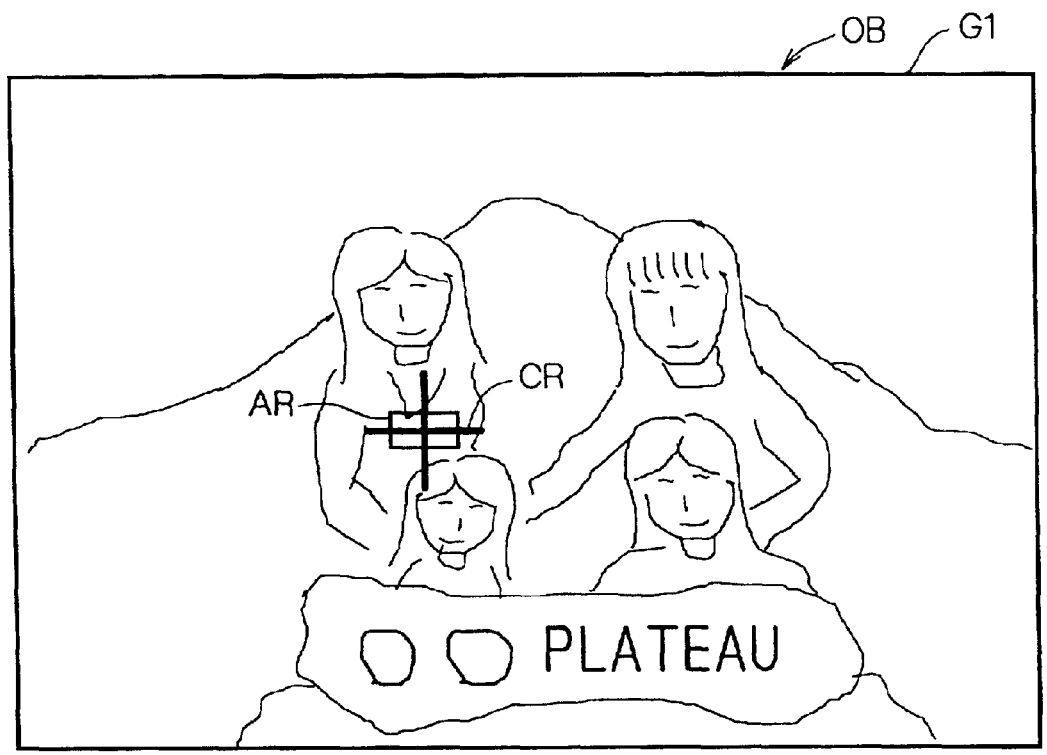
FIG. 29 is a drawing that explains operations of a digital camera in accordance with a second preferred embodiment of the present invention.
Figure 30:
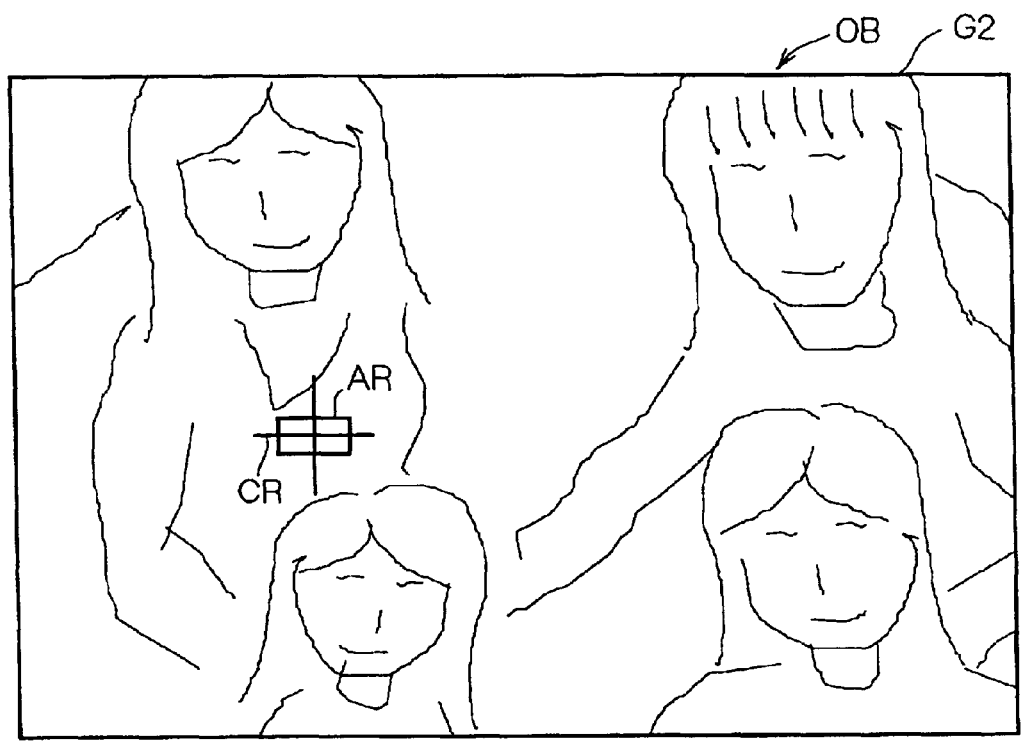
FIG. 30 is a drawing that explains an operation of the digital camera.

In the case when a zooming operation is carried out on a screen G1 shown in FIG. 29 with a focal length of 35 mm to a screen with a focal length of 70 mm, the screen is given as screen G2 shown in FIG. 30. In this screen G2, the position of the AF cursor CR is not the same as that of the AF cursor CR shown in screen G1 (FIG. 29), and follows the subject, and is maintained with respect to the subject.

Here, an explanation will be briefly given of the principle for allowing the position of AF cursor CR to be constant with respect to the subject even in the case of varied zooming magnifications.

Figure 31:
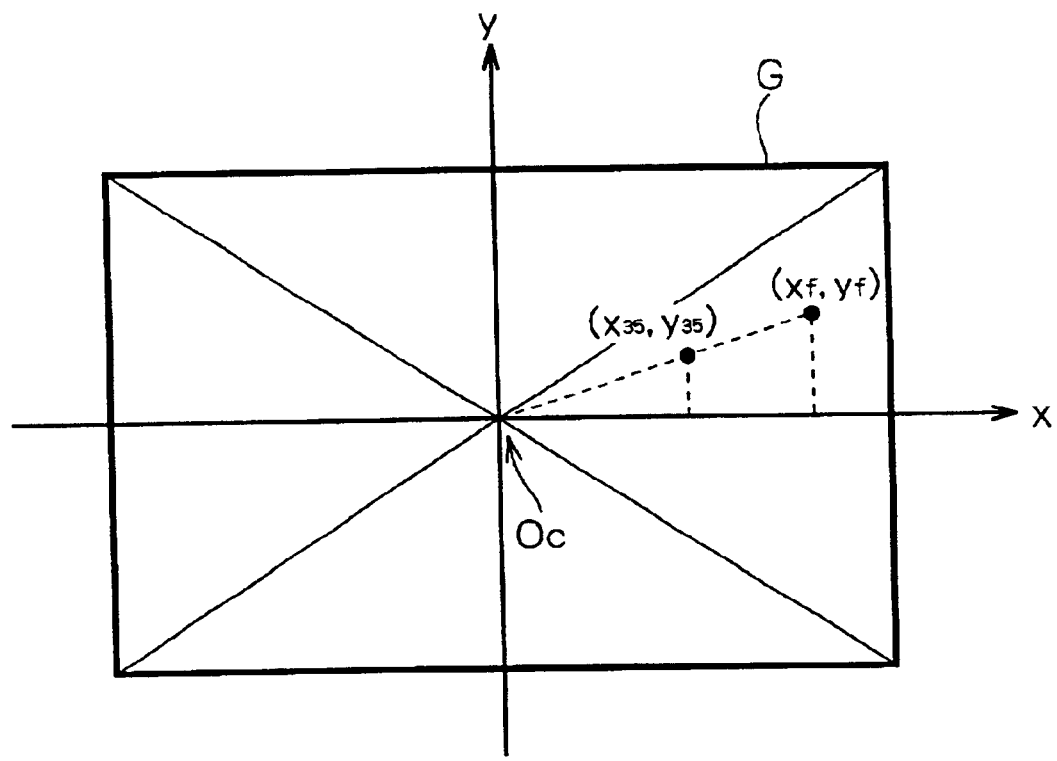
FIG. 31 is a drawing that explains an operation of the digital camera.

First, as illustrated in FIG. 31, supposing that the center of the screen G is Oc, that x-axis is set in the horizontal direction from the center Oc and that y-axis is set in the vertical direction therefrom, the coordinates of the AF cursor CR in the case of a focal length of 35 mm are set to ($x_{35}$, $y_{35}$), and the coordinates of the AF cursor CR in the case of a focal length f are set to ($x_f$, $y_f$). Then, the relationship between ($x_{35}$, $y_{35}$) and ($x_f$, $y_f$) is represented by the following equations (5) and (6):

$$\frac{y_f}{x_f} = \frac{y_{35}}{x_{35}} \quad (5)$$

$$\sqrt{x_f^2 + y_f^2} = \frac{f}{35}\sqrt{x_{35}^2 + y_{35}^2} \quad (6)$$

In other words, when coordinates ($x_{35}$, $y_{35}$) on the screen of the AF cursor CR set with a focal length 35 mm are found, by substituting the above-mentioned equations with the focal length f after the zooming operation, the coordinates ($x_f$, $y_f$) after the zooming operation can be obtained. The application of the coordinates ($x_f$, $y_f$) after the zooming operation allows the position of AF cursor CR to be constant with respect to the subject even in the case of varied zooming magnifications.

Figure 32:
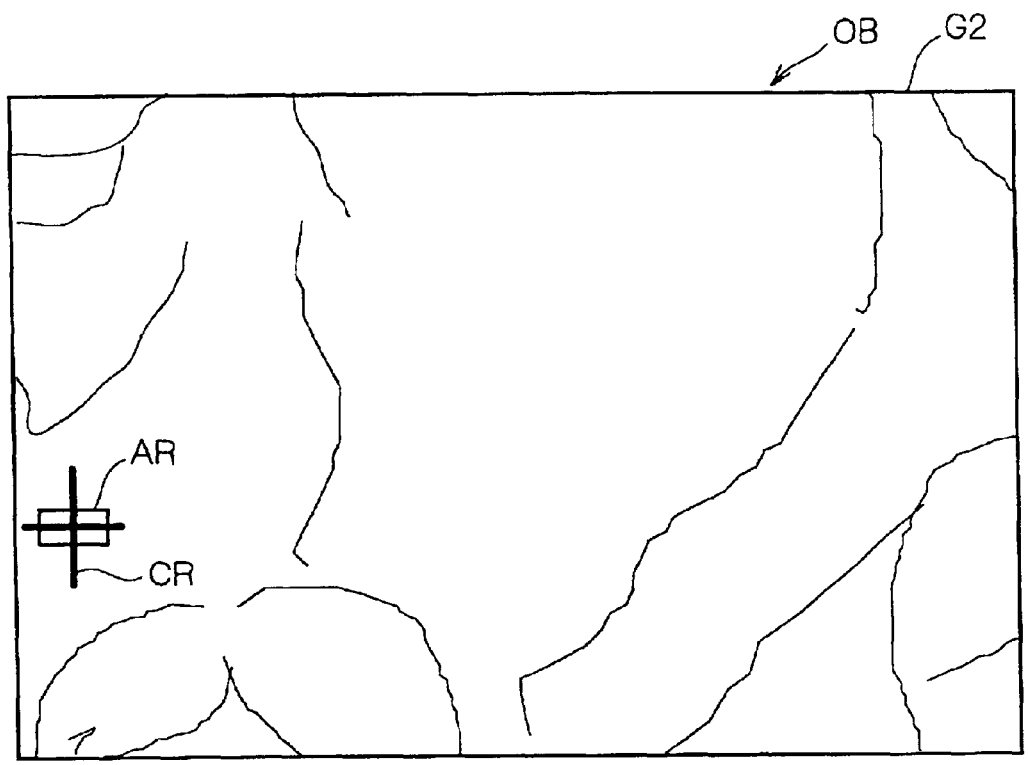
FIG. 32 is a drawing that explains an LCD screen when zoomed.

Moreover, in the case when an electronic zooming operation of double is carried out, if the enlarging rate with respect to the screen with a focal length of 35 mm is found, the coordinates on the screen after the zooming operation are found in the same manner. Therefore, even in the case of the electronic zooming operation, the position of the AF cursor CR is made constant with respect to the subject as illustrated in FIG. 32.

Figure 33:
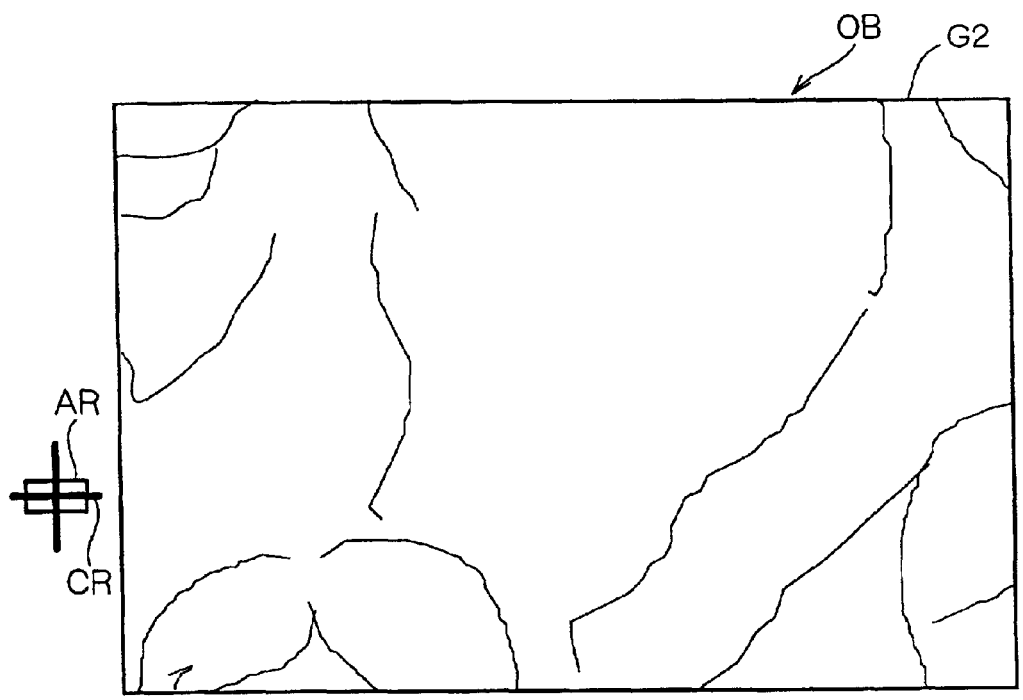
FIG. 33 is a drawing that explains an LCD screen when zoomed.
Figure 34:
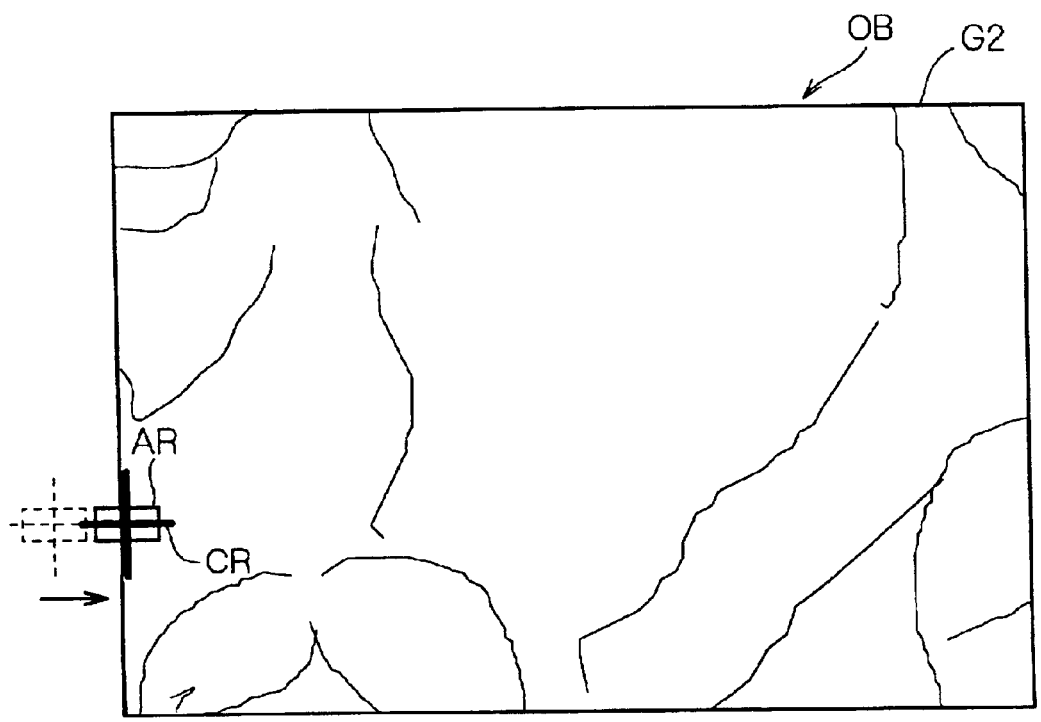
FIG. 34 is a drawing that explains an LCD screen when zoomed.

In the case when the AF cursor CR is located at the end of the screen, if a zooming operation is carried out, the AF cursor CR is shifted following the subject so that, as illustrated in FIG. 33, the AF cursor CR tends to stick out from the screen. In this case, as illustrated in FIG. 34, the AF cursor CR is allowed to shift to the end of the screen G2. Thus, it is possible to prevent the AF cursor CR from disappearing from the screen.

Figure 35:
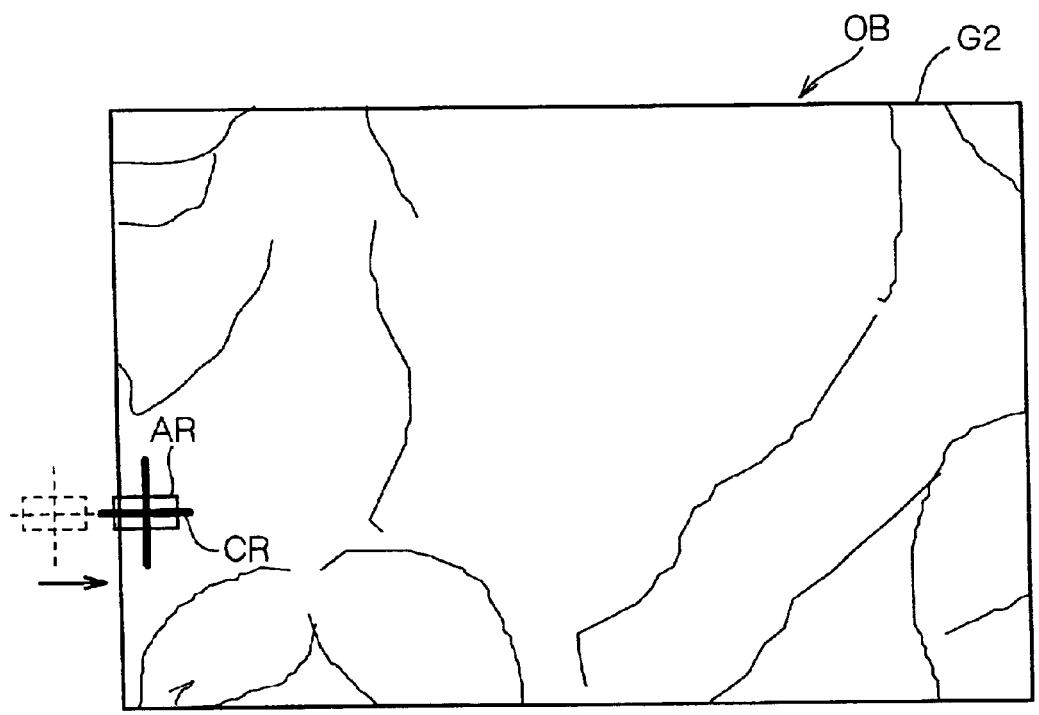
FIG. 35 is a drawing that explains an LCD screen when zoomed.

Here, in this case, as illustrated in FIG. 35, the AF cursor CR may be further shifted toward the inner side of the screen as shown in FIG. 34; that is, this may be shifted to a position close to the end of the screen. In the example of FIG. 35, since the cursor size is 16 pixels×16 pixels, it is shifted by a distance corresponding to 8 pixels from the end; however, it can be shifted to a degree in which the end of the cursor is made coincident with the edge of the screen. Thus, it is possible to allow the shooter to have an improved visibility in the AF cursor CR.

With the above-mentioned operations of the digital camera 1A, in the same manner as the first preferred embodiment, it becomes possible to improve the operability of the digital camera. Further, in the digital camera 1A, since the position of the AF cursor is made constant with respect to the subject, it is possible to carry out an appropriate focusing operation with a desired focusing point, even when a zooming operation is carried out.

<Modified Example>

In the above-mentioned preferred embodiments, a photometric area related to AE is set in response to the AF cursor; however, in a separate manner from the AF cursor, an AE cursor indicating the center of the photometric area that corresponds to a photometric point may be displayed.

Moreover, in the electronic zooming operation, not only trimming but also a pixel interpolating operation may be carried out after the trimming.

While the invention has been shown and described in detail, the foregoing description is in all aspects illustrative and not restrictive. It is therefore understood that numerous other modifications and variations can be devised without departing from the scope of the invention.

What is claimed is:

1. A digital camera comprising:
   an image sensor for picking up an image of a subject and for generating a subject image;
   a display for displaying said subject image generated by said image sensor on a screen;
   a specifying member for specifying a specific position on said screen;
   a calorimetric circuit for carrying out calorimetric calculations so as to adjust white balance of said subject image independent of said specified position specified by said specifying member; and
   an image-pickup controller for controlling an image-pickup operation based upon said specified position specified by said specifying member.

2. The digital camera according to claim 1, further comprising:
   an optical image-pickup system;
   wherein said image-pickup controller carries out a focusing operation of said optical image-pickup system with respect to said specified position on said screen that has been specified by said specifying member.

3. The digital camera according to claim 1, further comprising:
   a photometric circuit for measuring subject luminance;
   wherein said image-pickup controller carries out photometric calculations with respect to said specified position on said screen specified by said specifying member.

4. The digital camera according to claim 1, wherein said colorimetric circuit carries out calorimetric calculations on an entire portion of said subject image independent of said specified position specified by said specifying member.

5. A digital camera according to claim 1, further comprising:
   an altering member for altering magnification of said subject image displayed on said display; and
   a first specified position controller for maintaining a relationship between said subject and said specified position independent of an alteration of magnification carried out by said altering member.

6. The digital camera according to claim 5, further comprising:
   an optical image-pickup system;
   wherein said image-pickup controller carries out a focusing operation of said optical image-pickup system with respect to said specified position on said screen that has been specified by said specifying member.

7. The digital camera according to claim 6, wherein said optical image-pickup system has a variable focal length and said altering member alters a focal length of said optical image-pickup system.

8. The digital camera according to claim 6, wherein said altering member alters said magnification by displaying in an enlarged manner one portion of said subject image generated by said image sensor on said screen of said display.

9. The digital camera according to claim 8 further comprising:
   a cursor generator for generating a cursor corresponding to said specified position specified by said specifying member,
   wherein said display composes said cursor and said portion of said subject image to display the resulting image on said screen.

10. The digital camera according to claim 6, further comprising:
    a photometric circuit for carrying out a photometric operation with respect to a photometric area based upon said specified position,
    wherein in the case when said specified position is located at an edge of said screen, said image-pickup controller shifts a center of said photometric area in the center direction of said screen from said specified position.

11. The digital camera according to claim 5, further comprising:
    a photometric circuit for measuring subject luminance;
    wherein said image-pickup controller carries out photometric calculations with respect to said specified position on said screen specified by said specifying member.

12. The digital camera according to claim 11, further comprising:
    an optical image-pickup system having a variable focal length,
    wherein said altering member alters a focal length of said optical image-pickup system.

13. The digital camera according to claim 11, wherein said altering member alters said magnification of said subject image by displaying in an enlarged manner one portion of said subject image generated by said image sensor on said screen of said display.

14. The digital camera according to claim 5, further comprising:
    a second specified position controller for maintaining a relationship between said screen and said specified position independent of an alteration in said magnification by said altering member; and
    a selector for selecting either said first specified position controller or said second specified position controller.

15. The digital camera according to claim 14, wherein in the case when said second specified position controller is selected by said selector with said specified position being out of said screen of said display by said alteration in said magnification by said altering member, said second specified position controller shifts said specified position to a predetermined position within said screen.

16. The digital camera according to claim 15, wherein said predetermined position within said screen is on an edge of said screen or in a vicinity of an edge of said screen.

17. A method of operating a digital camera comprising the steps of:
- picking up an image of a subject;
- generating a subject image based on said picked up image of said subject;
- displaying said generated subject image on a screen;
- specifying a specific position on said screen;
- carrying out colorimetric calculations so as to adjust white balance of said subject image independent of said specified position; and
- controlling an image-pickup operation based upon said specified position.

18. An image taking apparatus, comprising:
- an image sensor for picking up an image of a subject;
- a display for displaying an image of a subject generated by the image sensor;
- an input mechanism for permitting a user to designate a position on said display;
- a means for changing a magnification of an image displayed on said display;
- a processor; and
- a memory for storing instructions executable by said processor, said instructions for enabling said processor to control operations of said apparatus;
- wherein said instructions executable by said processor include:
    - executable instructions, responsive to a user designation of a position on said display, for displaying on said display an indication of said designated position;
    - executable instructions, responsive to a user command, for invoking one of a first display designation magnification mode and a second display designation magnification mode;
    - executable instructions, operable when said first display designation magnification mode is invoked, for controlling the display of a magnified image of a subject on said display and for controlling the display of an indication of said designated position so that a location of said indication on said display prior to magnification is maintained after magnification in a same location relative to said display;
    - executable instructions, operable when said second display designation magnification mode is invoked, for controlling the display of a magnified image of a subject on said display and for controlling the display of an indication of said designated position so that a location of said indication on said display prior to magnification is maintained after magnification in a same location relative to said image of a subject; and
    - executable instructions for controlling an image pickup operation based on said designated position.

19. An image taking apparatus in accordance with claim 18, wherein said instructions executable by said processor include:
- executable instructions for performing photometric operations on an image of a subject generated by the image sensor,
- said executable instructions for performing photometric operations being configured in a first photometric mode to perform photometric operations based on a portion of said image corresponding to said designated position on said display,
- said executable instructions for performing photometric operations being configured in a second photometric mode to perform photometric operations based on a portion of said image shifted away from said designated position on said display.

* * * * *

UNITED STATES PATENT AND TRADEMARK OFFICE
CERTIFICATE OF CORRECTION

PATENT NO. : 6,853,401 B2
DATED : February 8, 2005
INVENTOR(S) : Shinichi Fujii et al.

It is certified that error appears in the above-identified patent and that said Letters Patent is hereby corrected as shown below:

Column 2,
Line 44, replace "camera", with -- digital camera --.

Column 5,
Line 63, replace "RAM 211 a", with -- RAM 211a --.

Column 15,
Line 34, replace both instances of "calorimetric", with -- colormetric --.
Line 57, replace "calorimetric", with -- colormetric --.

Signed and Sealed this

Twenty-third Day of August, 2005

JON W. DUDAS
*Director of the United States Patent and Trademark Office*